United States Patent
Kaneda et al.

(10) Patent No.: US 10,904,807 B2
(45) Date of Patent: Jan. 26, 2021

(54) INFORMATION PROCESSING SYSTEM

(71) Applicant: HONGO AEROSPACE INC., Tokyo (JP)

(72) Inventors: Kenya Kaneda, Tokyo (JP); Takahiro Miki, Tokyo (JP)

(73) Assignee: HONGO AEROSPACE INC., Tokyo (JP)

( * ) Notice: Subject to any disclaimer, the term of this patent is extended or adjusted under 35 U.S.C. 154(b) by 0 days.

(21) Appl. No.: 16/325,914

(22) PCT Filed: Aug. 15, 2017

(86) PCT No.: PCT/JP2017/029408
§ 371 (c)(1),
(2) Date: Jun. 4, 2019

(87) PCT Pub. No.: WO2018/034295
PCT Pub. Date: Feb. 22, 2018

(65) Prior Publication Data
US 2019/0289512 A1    Sep. 19, 2019

(30) Foreign Application Priority Data
Aug. 16, 2016   (JP) ................................. 2016-159766
May 19, 2017   (JP) ..................... PCT/JP2017/018908

(51) Int. Cl.
*H04W 36/00*   (2009.01)
*B64C 39/02*   (2006.01)
(Continued)

(52) U.S. Cl.
CPC ............. *H04W 36/03* (2018.08); *B64C 13/20* (2013.01); *B64C 39/02* (2013.01); *B64C 39/024* (2013.01);
(Continued)

(58) Field of Classification Search
CPC ..... H04W 36/00; H04W 36/03; H04W 88/06; G05D 1/00; G05D 1/0022
See application file for complete search history.

(56) References Cited

U.S. PATENT DOCUMENTS

2003/0182451 A1* 9/2003 Grass ................ H04L 29/06027
709/246
2011/0174925 A1   7/2011 Ying
(Continued)

FOREIGN PATENT DOCUMENTS

JP   2007276507 A   10/2007
JP   2014104797 A   6/2014
(Continued)

OTHER PUBLICATIONS

International Search Report corresponding to Application No. PCT/JP2017/029408; dated Nov. 21, 2017.
(Continued)

*Primary Examiner* — Chi Ho A Lee
(74) *Attorney, Agent, or Firm* — Cantor Colburn LLP

(57) ABSTRACT

Provided are a device for communicating with and controlling a small unmanned airplane, and a method therefor. In an information processing system to which the present invention is applied, a drone 2 is provided with: a converter module 10 that operates on a storage battery; an onboard communication means 15; an FDR module; a drive unit or the like, not illustrated; a leg section L that contacts or approaches a landing port P; and a charging terminal T2 for supplying power for charging to the storage battery, the charging terminal T2 being disposed in the proximal area. The landing port P is the landing port where the drone 2 lands, and has a projection B for guiding the leg section L onto a planar section F.

3 Claims, 16 Drawing Sheets

(51) Int. Cl.
*G05D 1/00* (2006.01)
*G06F 13/00* (2006.01)
*H04Q 9/00* (2006.01)
*B64C 13/20* (2006.01)
*H04W 88/06* (2009.01)

(52) U.S. Cl.
CPC ........... *G05D 1/0022* (2013.01); *G06F 13/00* (2013.01); *H04Q 9/00* (2013.01); *B64C 2201/146* (2013.01); *H04W 88/06* (2013.01); *Y02T 50/60* (2013.01)

(56) References Cited

U.S. PATENT DOCUMENTS

| | | | | |
|---|---|---|---|---|
| 2013/0176967 A1* | 7/2013 | Liu | ............... | H04W 48/18 370/329 |
| 2016/0068264 A1* | 3/2016 | Ganesh | ............... | G01S 19/42 701/2 |
| 2016/0119052 A1* | 4/2016 | Frerking | ............... | H04W 24/02 455/431 |
| 2017/0111102 A1* | 4/2017 | Fan | ............... | H04B 7/18504 |
| 2017/0208512 A1* | 7/2017 | Aydin | ............... | B64C 39/024 |
| 2017/0217323 A1 | 8/2017 | Antonini et al. | | |
| 2017/0336203 A1* | 11/2017 | Barnes | ............... | G05D 1/101 |
| 2017/0351933 A1* | 12/2017 | Bleiweiss | ............... | G06T 7/0004 |
| 2017/0352941 A1* | 12/2017 | Peitzer | ............... | H04B 7/18504 |
| 2018/0343701 A1* | 11/2018 | Ma | ............... | H04W 80/02 |
| 2019/0166596 A1* | 5/2019 | Zhu | ............... | H04W 8/082 |
| 2020/0012829 A1* | 1/2020 | Davidson | ............... | B64C 39/022 |

FOREIGN PATENT DOCUMENTS

| | | |
|---|---|---|
| JP | 2015042539 A | 3/2015 |
| JP | 2015207149 A | 11/2015 |
| JP | 2016005228 A | 1/2016 |
| WO | 2016019978 A1 | 2/2016 |
| WO | 2016143806 A1 | 9/2016 |

OTHER PUBLICATIONS

JPO Notification of Reasons for Refusal issued in the corresponding JP Patent Application No. 2018-534406, dated Feb. 12, 2020.

* cited by examiner (TO SMARTPHONE AND THE LIKE OR Wi-Fi SPOT AND THE LIKE)

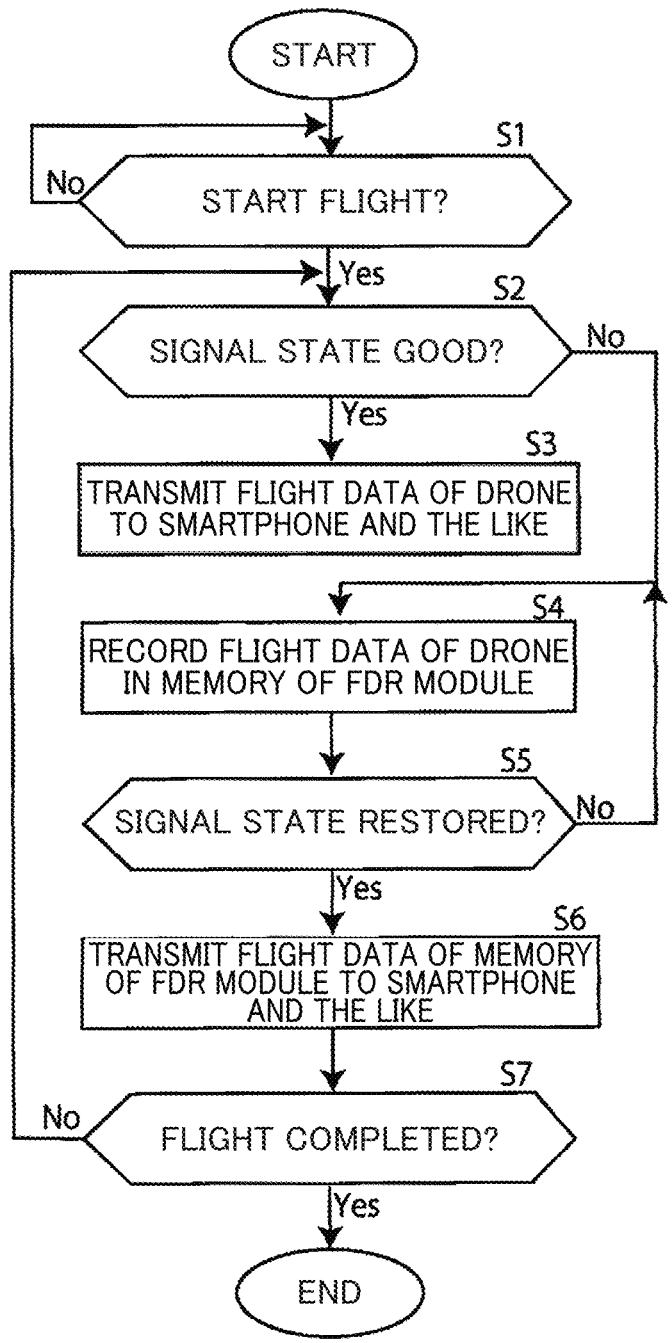

LANDING PORT
DRONE (AT TIME OF LANDING)

INFORMATION PROCESSING SYSTEM

CROSS REFERENCE TO RELATED APPLICATIONS

This is the U.S. national stage of application No. PCT/JP2017/029408, filed on Aug. 15, 2017. Priority under 35 U.S.C. § 119(a) and 35 U.S.C. § 365 (b) is claimed from Japanese Application No. 2016-159766, filed on Aug. 16, 2016 and Application No. PCT/JP2017/018908, filed on May 19, 2017; the disclosure of which are incorporated herein by reference.

TECHNICAL FIELD

The present invention relates to an information processing system.

BACKGROUND ART

In recent years, research and development of a small unmanned airplane (typically a drone) have been actively conducted (see, for example, Patent Document 1).

Patent Document *: Japanese Unexamined Patent Application, Publication No. 2015-207149

DISCLOSURE OF THE INVENTION

Problems to be Solved by the Invention

In the present application, the following inventions are disclosed with respect to an information processing system and the like of a small unmanned aircraft. These inventions have a common object to provide a novel control device and control method for a small unmanned aircraft. In the present application, "background art" related to each invention, "problems to be solved by the invention", "means for solving the problems" and "effects of the invention" of disclosure of the invention are described separately in the item of "Preferred mode for carrying out the invention".

The present invention has been made in view of such a situation, and it is an object thereof to provide a novel information processing system and the like of a small unmanned aircraft.

[First Invention] Converter module
[Second Invention] Flight recorder module
[Third Invention] Safety control
[Fourth Invention] Laser track 1
[Fifth Invention] Universal platform (software aspect) (hardware aspect)
[Sixth Invention] Landing port
[Seventh Invention] Landing proximity technology
[Eighth Invention] Dither control and dither clip
[Ninth Invention] Contact prevention and individual authentication Means for Solving the Problems An information processing system according to an embodiment of the present invention includes:
  a moving body including an operating unit operating on a storage battery, a proximal area that contacts or approaches a landing port, and a power supply unit that is disposed in the proximal area and that supplies power for charging the storage battery; and
  the landing port where the moving body lands and having a guiding area for guiding the proximal area to a substantially predetermined position.

Further, the guiding area may be a recess arranged in a part of a portion where the proximal area of the moving body may contact or approach.

In addition, the guiding area may be a projection arranged on a part of a portion where the proximal area of the moving body may contact or approach.

Further, the landing port
  may further include a power feed unit for supplying power to the moving body for each polarity, and
  a width of each power feed unit may be shorter than a width between a plurality of the power supply units having different polarities.

Further, the landing port may further include, on a surface that approaches the proximal portion,
  a first projection, and
  a power feed unit fixed independently of the first projection at a position lower than the first projection so as to supply power to the moving body,
  the proximal area may further include, on a surface that approaches the landing port, a second projection that contacts the first projection when the moving body lands on the landing port, and
  the power supply unit disposed at a position lower than the first projection,
  when the first projection and the second projection come into contact with each other, the first projection descends due to a weight of the moving body, whereby the power feed unit and the power supply unit come into contact with each other, and
  when the first projection and the second projection are separated from each other, the first projection ascends by a repulsive force of an elastic body, whereby the power feed unit may return to the position lower than the first projection.

Further, the moving body may further include
  the power supply unit provided on a side portion of the moving body, and
  the landing port may further include
  on a surface that approaches the power supply unit, a power feed unit for supplying power to the moving body, and
  a conveying unit that conveys the moving body until the power feed unit and the power supply unit come into contact with each other when the proximal area and the landing port come into contact with each other and guidance is performed by the guiding area.

Effects of the Invention

According to these inventions, it is possible to provide a novel control device and control method for a small unmanned aircraft.

BRIEF DESCRIPTION OF THE DRAWINGS

FIG. 5 is a flow diagram describing a process of recording flight data of a drone.

FIG. 8B is a diagram describing safety control performed by specifying a specific area with map information, not by specifying the specific area with an actual place, a building, or the like.

PREFERRED MODE FOR CARRYING OUT THE INVENTION

Figure 1A:
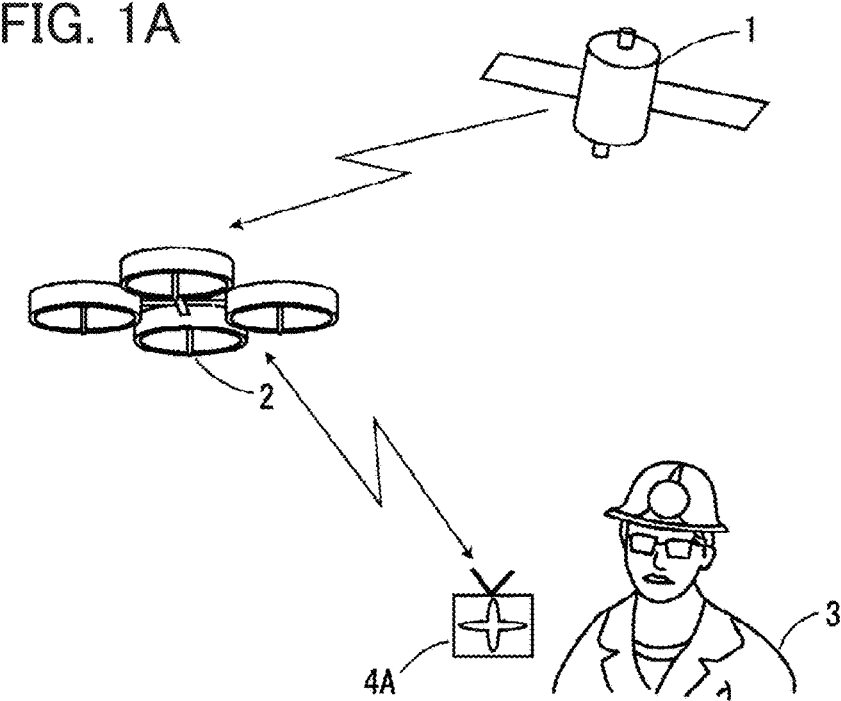
FIG. 1A is a diagram describing an overall image of communication and flight control between a current drone and a dedicated controller.

As a representative example of a small unmanned aircraft, drone is known. Hereinafter, embodiments of communication and a control apparatus and a method thereof for a small unmanned aircraft according to an embodiment of the present invention will be described in detail while taking a drone as an example with reference to the accompanying drawings. In the figures, the same reference numerals are attached to the same elements, and redundant explanations thereof are omitted. An overall image of communication and control device of a drone 2 will be described first and then first to eighth embodiments corresponding to the first to ninth invention will be explained in turn.

[Overall Outline of Communication and Control Device of Drone]

FIG. 1A is a diagram describing an overall image related to communication and flight control between a conventional drone and a dedicated controller.

Figure 1B:
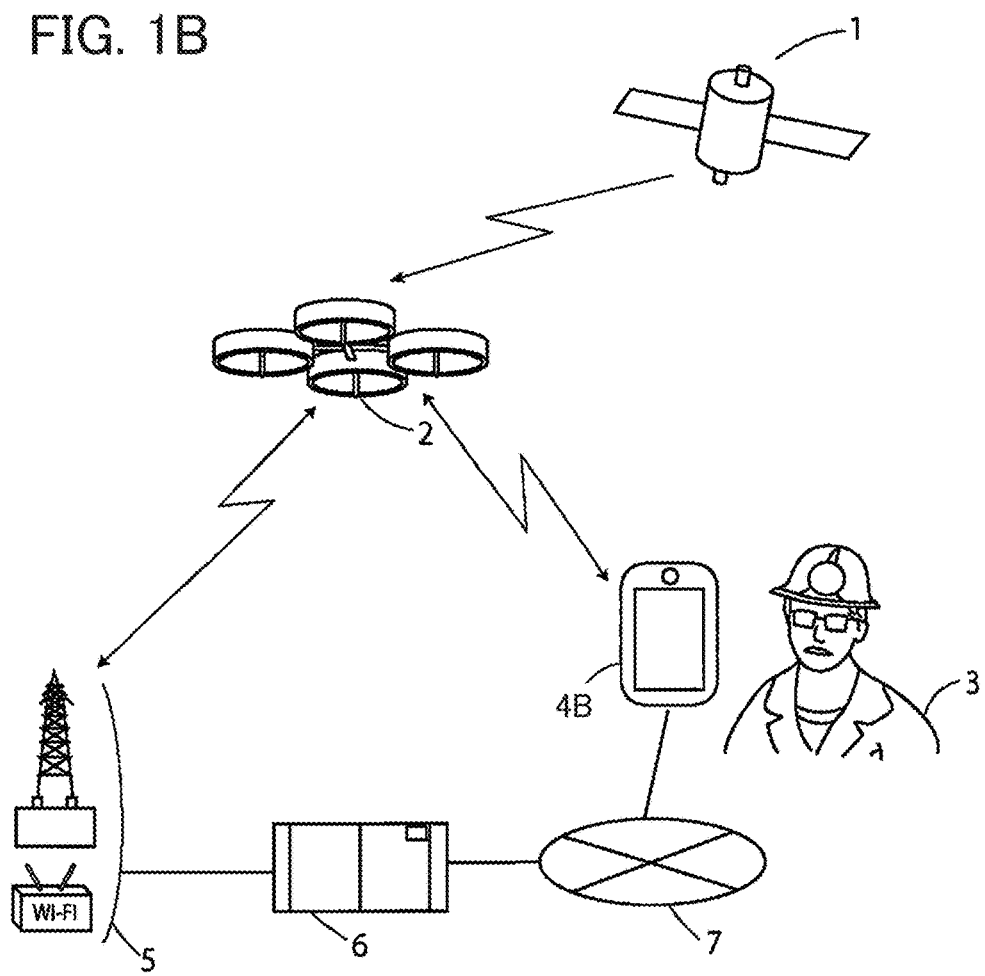
FIG. 1B is a diagram describing an overall image of communication and flight control between a drone of the present embodiment and a portable terminal directly or via a communication line.

As illustrated in FIG. 1A, the drone 2 is acquiring positioning information from a Global Positioning System (GPS) satellite 1 in the sky. The drone 2 transmits GPS positioning data, flight data (for example, posture information, rotational motion information, and the like.) obtained from various onboard sensors of the drone, and the like to a dedicated controller 4A possessed by a pilot 3. The pilot 3 transmits a flight control command to the drone 2 while referring to the GPS positioning data of the drone 2, the flight data, and the like. As described above, a flight area of the drone 2 is limited to a reachable range of radio wave of the dedicated controller 4A. However, there is a desire to utilize the drone 2 even in a wider area beyond the reachable range of radio wave of the dedicated controller 4A. FIG. 1B is a diagram describing an image for communication and flight control between the drone in the present embodiment and a portable terminal directly or via a communication line.

When the drone 2 is flying within the reachable range of radio wave of the portable terminal 4B, direct communication is performed between the drone 2 and the portable terminal 4B. That is, the drone 2 performs an operation such as flight based on an operation of the information processing terminal 4B by a drone pilot 3.

However, when the drone 2 is flying in an area outside the reachable range of radio wave of the portable terminal 4B, the communication between the drone 2 and the portable terminal 4B is performed by the following route. That is, a GPS satellite 1 exists in outer space above the flying drone 2, and GPS data (information for specifying a current position of the drone 2) is transmitted to the drone 2. Communication is performed between the drone 2 and the Wi-Fi (registered trademark) spot and the like 5, and the data is processed and recorded by a server computer 6. The Wi-Fi (registered trademark) spot and the like 5 may include not only the Wi-Fi (registered trademark) spot but also a radio tower and the like. The information processing terminal 4B is configured with a smartphone and the like, and is operated by the drone pilot 3. The information processing terminal 4 can connect to the server computer 6 via a communication line 7 such as the Internet or a portable carrier network and obtain various data of the drone 2 recorded therein. In this manner, the information processing terminal 4B and the drone 2 can communicate with each other via the server computer 6 via the communication line 7 such as the Internet or the portable carrier network. Therefore, in the present application, this route is hereinafter referred to as a "route via server".

Further, as described above, when the drone 2 is flying within the reachable range of radio wave of the portable terminal 4B, direct communication also occurs between the drone 2 and the information processing terminal 4B as in the case of FIG. 1A. In this case, the drone pilot 3 can operate the information processing terminal 4B communicating with the drone 2 in real time. The data of the information processing terminal 4B is processed and recorded by the server computer 6 via the communication line 7. In this manner, the drone 2 and the information processing terminal 4B can directly communicate in real time. Hereinafter, in the present application, this communication route is referred to as a "direct route". The "direct route" has an advantage of real-time communication, while it has a disadvantage that there is a limitation in a reachable distance of the radio wave. On the other hand, the "route via server" has an advantage that there is no limitation in the distance, but in general it has a disadvantage that there is a time lag compared to the real-time communication.

The first to ninth embodiments described below are realized under such an image.

FIRST EMBODIMENT

Converter Module

Currently, in Japan, a drone 2 is legally forbidden to mount an information processing terminal. However, for example, in the United States, there is no provision like this. Therefore, it is expected that this prohibition provision will be relaxed in Japan in the future. In a case where the legal restriction is relaxed, a need to operate the drone 2 on the information processing terminal 4B is considered to be high. The first embodiment intends to provide a converter module enabling communication between the drone 2 and the information processing terminal 4B. That is, the first embodiment has an object of providing a converter module capable of simultaneously connecting to a communication line 7 such as the Internet or a portable carrier network while connecting to an onboard communication device of the drone 2 by wireless communication, and enabling a drone pilot 3 to use the information processing terminal 4B so as to operate via not only a direct route but also a route via server.

Figure 2:
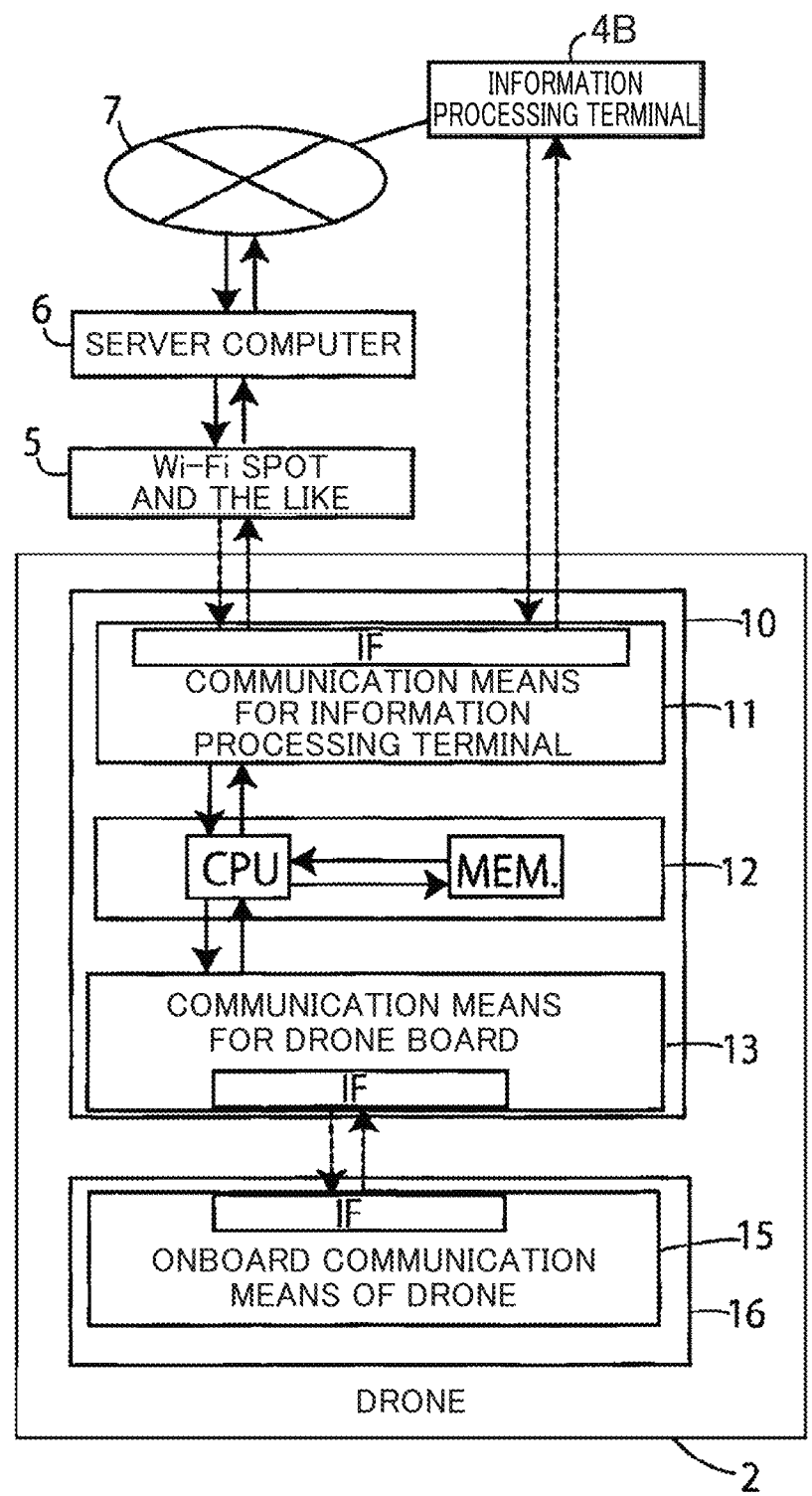
FIG. 2 is a block diagram describing an overview of a converter module according to a first embodiment.

FIG. 2 is a block diagram describing an outline of a converter module 10 according to the first embodiment.

A drone board 16 is a board such as an onboard control circuit of the drone 2. An onboard communication means 15 of drown is mounted on the drone board 16. The converter module 10 is mounted on the drone 2 and roughly includes a communication means 11 for information processing terminal capable of communicating with the information processing terminal 4B via a communication line 7, a control means 12 having a Central Processing Unit (CPU) and a memory, and a communication means 13 for drone board capable of communicating with the onboard communication means 15 of drown in the drone board 16. The converter module 10 is configured with one or a plurality of modules.

Each element will be described below. The communication means 11 for information processing terminal adopts a configuration corresponding to a communication mode of the information processing terminal 4B of a communication partner. The communication means 11 for information processing terminal may adopt a configuration in which, for example, a Wi-Fi (registered trademark) (internet connection using a wireless LAN), Bluetooth (one of inexpensive short-distance wireless standards for digital equipment, (registered trademark)), 3G high speed (for third generation mobile phone), 4 G LTE (for information processing terminal using LTE), or the like is used.

The control means 12 includes a CPU and a memory. Although the CPU may be an arbitrary CPU, it is preferable that the CPU can perform high-speed processing so that the drone 2 and the information processing terminal 4B can communicate with each other in real time. The memory has a Random Access Memory (RAM) for processing and recording data, a Read Only Memory (ROM) for storing a control application program in advance, and the like. By recording application program corresponding to types of the information processing terminal 4B and the drone 2 in advance, the control means 12 is customized. The information processing terminal 4B to be operated is also customized by a necessary application program.

A configuration of the communication means 13 for drone board is determined based on the communication mode of the onboard communication means 15 of drown mounted on the drone board 16 of the drone 2 and its configuration is determined. For example, the communication means 13 for drone board may adopt a configuration that uses Wi-Fi (registered trademark), Bluetooth (registered trademark) or the like currently adopted in the drone 2.

The communication by the "route via server" explained in FIG. 1 is as follows.

(1) Various signals such as flight data from the onboard communication means 15 of drown mounted on the drone board 16 of the drone 2 are received by the communication means 13 for drone board of the converter module 10, processed by the control means 12 to be converted to a communication mode of the information processing terminal 4B, and transmitted from the communication means 11 for information processing terminal to the information processing terminal 4B via the server computer 6 and the communication line 7. Here, the route via server in an example of FIG. 2 includes the converter module 10 of the drone 2, the Wi-Fi (registered trademark) spot and the like 5, the server computer 6, the communication line 7, and the information processing terminal 4B in this order, but this is merely an example and it suffices if it is a route via the server computer 6 and the communication line 7. For example, when the communication line 7 is a carrier network of a predetermined mobile phone and the Wi-Fi (registered trademark) spot and the like 5 is a repeater and the like of the carrier network, the following route may be adopted as the route via server. That is, the onboard communication means 15 of drown, the converter module 10, the Wi-Fi (registered trademark) spot and the like 5

(the repeater and the like of the carrier network), the communication line 7 (carrier network), the server computer 6, the Internet (not illustrated) (also including the repeater and the like of the internet such as the Wi-Fi (registered trademark) spot and the like), and the information processing terminal 4B may be adopted as the route via server. In this case, the converter module 10 converts a signal as a transmission target from the onboard communication means 15 of drown into a signal based on the communication mode of the carrier, and transmits the signal to the Wi-Fi (registered trademark) spot and the like 5 (the repeater and the like of the carrier network).

(2) On the contrary, a command signal such as piloting from the information processing terminal 4B is received by the communication means 11 for information processing terminal of the converter module 10 via the route via server including the server computer 6 and the communication line 7, converted into the communication mode of the drone 2 by the control means 12, and transmitted from the communication means 13 for drone board to the onboard communication means 15 of drown. Communication by a "direct route" explained in FIG. 1 is as follows.

(3) Various signals such as flight data from the onboard communication means 15 of drown are directly transmitted to the information processing terminal 4B. In the example of FIG. 2, various signals such as flight data from the onboard communication means 15 of drown are transmitted via the converter module 10, but may be directly transmitted to the information processing terminal 4B without being transmitted via the converter module 10 in particular.

(4) On the contrary, a command signal such as piloting from information processing terminal 4B is directly transmitted to drone 2.

Figure 3A:
FIG. 3A is a diagram illustrating an example of a configuration of a packet signal in a case where a command signal (command) is transmitted from an information processing terminal to a drone.

FIG. 3A is a diagram illustrating an example of a data structure of a packet signal in a case where a flight control command is transmitted from the information processing terminal 4B to the drone 2. Here, a user ID is data for identifying the user, and a user authentication ID is data on security that prevents hacking, for example. For the command 1, it is possible to insert therein GPS coordinates, a posture, and a movement command (for example, moving to the right by 10 m, and the like.) that specifies a position of the drone 2. The aforementioned packet signal is operated from an application program and the like installed in the portable information processing terminal 4B.

Figure 3B:
FIG. 3B is a diagram illustrating an example of a configuration of a packet signal for a drone obtained by a converter module converting the packet signal illustrated in FIG. 3A in accordance with a type of drone.

FIG. 3B is a diagram illustrating an example of a data structure of a packet signal for drone obtained by the converter module 10 converting the packet signal illustrated in FIG. 3A in accordance with the type of drone 2. The control means 12 of the converter module 10 converts a command 1 into a command 2 in accordance with a signal mode of the drone 2. For example, for the drone 2 where the GPS device is not mounted, the GPS coordinate data included in the command 1 is deleted. Since this signal conversion is executed by an application program prepared according to the communication mode of the drone 2, the information processing terminal 4B can cope with a type of the drone 2 having a different communication mode. In the case of the "route via server," a part or all of signal conversion between the drone 2 and the information processing terminal 4B may be executed by the server computer 6 as necessary. Specifically, for example, in the case of communicating from the server computer 6 to the converter module 10, the server computer 6 may convert a packet for transmission according to a type of a fuselage of the drone 2 at destination. In other words, by performing conversion from command 1 to command 2, it is possible to absorb the difference in the type of drone 2, but a place where this conversion is performed may be arbitrary as long as it is within the route via server including the converter module 10. Furthermore, in the case of using the "direct route" and the "route via server," a part or all of signal conversion between the drone 2 and the information processing terminal 4B may be executed by the application program read into the information processing terminal 4B as necessary. That is, in a case where a command is sent from the converter module 10 to the drone 2, the converter module 10 can be implemented by Inter-Integrated Circuit (I2C) communication by connecting the Wi-Fi (registered trademark) or a physical cable.

Figure 3C:
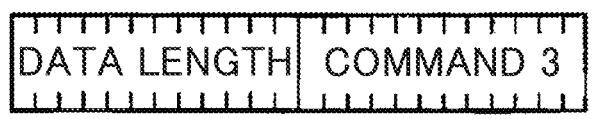
FIG. 3C is a diagram illustrating an example of a configuration of a packet signal for a drone in the case of I2C.

FIG. 3C illustrates an example of I2C communication. That is, it is also possible to convert the command 2 to the command 3, delete an authentication ID or the like for preventing hacking and the like, and adopt the packet signal only with the operation command of the drone 2.

By using the converter module 10, it is possible to communicate with any desired drone 2 from the information processing terminal 4B. Further, in a case where the "route via server" is adopted, by communicating with the drone 2 from the information processing terminal 4B via the communication line 7 and the server computer 6, there is no limitation in a distance within which communication can be executed. Further, the converter module 10 has a feature that it can be retrofitted to a fuselage of any desired drone 2.

The second to eighth embodiments to be described below are based on the premise that the converter module according to the first embodiment is incorporated as necessary and that the drones 2 and the information processing terminal 4B can communicate with each other.

In summary, the converter module 10 of the first embodiment functions as a converter of the communication signal. The converter module 10 can convert a signal exchanged between the information processing terminal 4B that can be connected to carrier networks of various mobile phones such as 3G, LTE, 5G (next generation) and the like and a drone board 16 mounted on the drone 2 connected or the like by Wi-Fi (registered trademark), Bluetooth (registered trademark), radio control radio receiver, physical connector or the like into a mutually-usable form. The Bluetooth (registered trademark) described above may include Bluetooth (registered trademark) Low Energy (BLE). Further, depending on the type of the drone 2, there is a need to add customization to the conversion processing by the CPU or to modify application software and the like in the information processing terminal 4B operated by the user. In this respect, the following operational flow is conceivable. Specifically, for example, the information transmitted from the drone 2 is transmitted to the server computer 6 via the communication line 7 such as a portable carrier network, and finally transmitted to the portable information processing terminal 4B. The communication was operated by directly connecting the conventional portable information processing terminal with the drone 2 via Wi-Fi (registered trademark), but when performing the communication in the manner described above, a signal (information) of the same content is transmitted from the converter module 10 via Wi-Fi (registered trademark) via the communication line 7 such as the portable carrier network, whereby the drone 2 can be operated beyond a connection range of the Wi-Fi (registered trademark). As described above, a keyword in the first embodiment are SIM, carrier communication network, Wi-Fi (registered trademark), converter, remote operation, and the like.

Since to mount SIM on the drone 2 is prohibited by the current law of Japan, the drone has been tested while not flying. In addition, the flight is possible in the United States and the like.

Further, the communication control apparatus to which the present invention is applied is not limited to the above-described first embodiment, and various kinds of embodiments having the following configurations can be taken. That is, a communication control apparatus to which the present invention is applied is a communication control apparatus (for example, a converter module 10) that controls a communication between a first information processing apparatus (for example, the information processing terminal 4B) that performs a communication based on a first communication mode and a second information processing device (for example, the drone 2) that performs a communication based on a second communication mode different from the first communication mode, the communication control apparatus including:

a first communication mode conversion means that receives a first signal from the first information processing apparatus based on the first communication mode and converts a communication mode of the first signal into the second communication mode;

a first transmission control means that executes control to transmit the first signal to the second information processing apparatus based on the second communication mode;

a second communication mode conversion means that receives a second signal from the second information processing apparatus based on the second communication mode and converts a communication mode of the second signal into the first communication mode; and a second transmission control means that executes control to transmit the second signal to the first information processing apparatus based on the first communication mode.

Thus, it is possible to provide a novel communication control apparatus and control method for a small unmanned aircraft. Further, in the communication control device, the first communication mode conversion means receives the first signal via a communication network (for example, the communication line 7) based on the first communication mode, and the second communication mode conversion means executes control to transmit the second signal to the first information processing apparatus via the communication network (for example, the communication line 7) based on the first communication mode. In this way, it becomes possible to adopt the "route via server," and there is no limitation in the distance within which the communication can be performed.

SECOND EMBODIMENT

Flight Recorder Module

For a general civil aircraft, it is compulsory to mount a flight recorder (hereinafter, referred to as FDR) for recording instructions transmitted to various electronic systems of the aircraft. The FDR constantly records flight data of an aircraft where the FDR is mounted. In the event of an aircraft accident, it is possible to identify a cause and a factor of the accident by analyzing the flight data recorded in the FDR in many cases. It is also important for drone to record flight data so that the flight data can be analyzed afterwards. In the second embodiment, for the sake of convenience of explanation, explanation is limited to drone 2, but it is not particularly limited thereto. It is also possible to employ other machines, such as robots.

The second embodiment aims to provide an FDR module that constantly records positional information and/or posture information of the drone 2 in flight. For example, this FDR module is useful for investigating an accident or specifying a location of crash of the drone 2, discovering a drone 2 that makes suspicious movements, debugging on development and the like, and may be utilized in order to avoid collision and the like in the future. In a plurality of embodiments including the second embodiment, a module (for example, an FDR module) integrating a communication device, a CPU, a memory, a sensor (for example, GPS, IMU, and the like) is provided.

Figure 4:
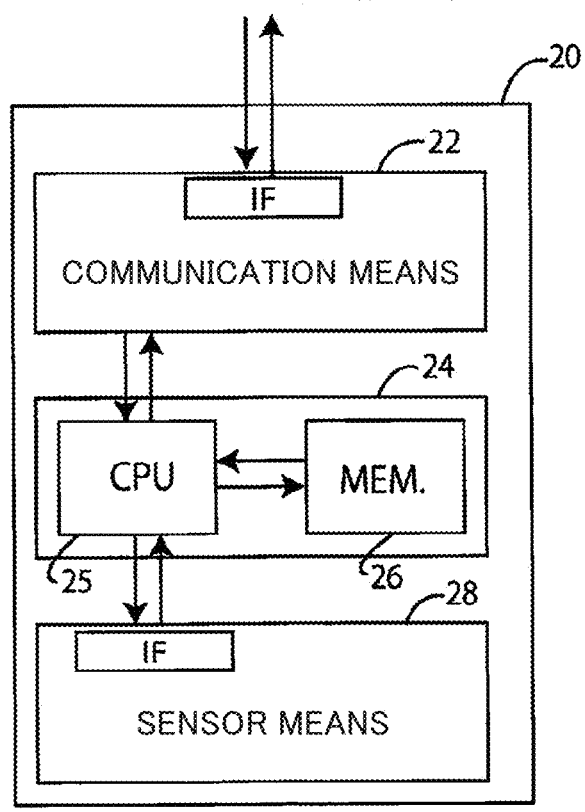
FIG. 4 is a block diagram schematically describing an FDR module according to a second embodiment.

FIG. 4 is a block diagram schematically describing the FDR module 20 according to the second embodiment. The FDR module 20 roughly includes a communication means 22, a control means 24, and a sensor means 28. The FDR module 20 is mounted on or connected to a part of a control board mounted on the drone 2 in advance, and is constituted by one or a plurality of modules. Specifically, for example, the FDR module 20 can be configured as at least a part of the drone board 16 in FIG. 2. In this case, if the "route via server" is not adopted, the converter module 10 is not a constituent element essential to the second embodiment. On the other hand, the FDR module 20 may be configured as at least a part of the converter module 10. In addition, it is sufficient for the FDR module 20 to be mounted on the drone 2, and a part of the FDR module 20 may be mounted on the drone board 16, another part of the FDR module 20 may be mounted on the converter module 10, or the FDR module 20 may be mounted on a board not illustrated in FIG. 2 which is different from the drone board 16 or the converter module 10.

Each element will be described below. The communication means 22 is constituted by an arbitrary communication device. For example, Wi-Fi (registered trademark), Bluetooth (registered trademark), 3G high speed, 4G LTE and the like may be used. That is, an arbitrary communication device constituting the communication means 22 may perform communication by using a device for connecting to the Internet and a terminal Wi-Fi (registered trademark), Bluetooth (registered trademark, including BLE), and a portable carrier line (3G, LTE, and thereafter).

The control means 24 includes a CPU 25 and a memory 26. The CPU 25 is a computer that interacts with the network. Specifically, for example, the CPU 25 applies a detection value of a sensor means 28 described below to a filter to remove noise, performs packetization processing, and performs encryption processing or the like as necessary. Further, it selects a communication line, logs on to a system, controls recording and calling processing of flight data in a memory. The CPU 25 may be an arbitrary CPU, but since it is necessary to process the flight data in real time during the flight of the drone 2, it is preferable that a processing speed is high.

The memory 26 includes a RAM for recording various flight data from the sensor means 28, which is processed by the CPU 25, a ROM for storing various application programs in advance, and the like. If necessary, the control means 24 is customized by recording a predetermined application program, for example, according to a type of the drone 2. The RAM is a primary storage device and holds sensor information when it is not connected to the network.

The sensor means 28 includes GPS (including DGPS, QZSS (quasi satellite system) and the like), IMU (including a complete sensor (acceleration, angle, and angular velocity) and the like) and any desired various sensors. In other words, a representative sensor included in the sensor means 28 includes a Global Positioning System (GPS) for specifying a flight position of the drone 2 and an inertial measurement device (IMU) for specifying movement (velocity, acceleration, and the like) and posture (tilt and the like) of the drone 2 during flight. With respect to the sensor already mounted on the drone 2 itself, it is possible to use the sensor instead of mounting a new sensor on the sensor means 28.

The GPS is a system where signals are received from a plurality of US military satellites and the drone 2 specifies its current position in three dimensions. The GPS may be DGPS (relative positioning method GPS) as a modified GPS where GPS radio wave is received and error is canceled even at a ground base station whose location is known in advance, QZSS (quasi zenith satellite system) that secures and reinforces US GPS using three satellites that are also seen in a specific area, and the like. The IMU is a device that detects angles (or angular velocities) and accelerations of three axes that govern the movement of the drone 2.

With reference to FIG. 1B and FIG. 4, recording of flight data of the drone 2 will be described in accordance with FIG. 5. At first, the case of the "direct route" is described. In step S1, it is determined whether or not the flight is started. Recording of flight data is started from the start of flight, and the process proceeds to step S2.

In step S2, communication state (for example, radio wave intensity, signal quality, and the like) between an onboard FDR module 20 of the drone and the information processing terminal 4B is determined. A signal state is determined to be good if strength, quality and the like of the received signal exceeds a predetermined threshold (threshold level), and determined to be poor if equal to or less than the threshold. The poor communication state occurs, for example, when the radio wave is temporarily or continuously blocked by a high building or the like, not only in a case where the drone 2 enters the "route via server" but also in a case where it is flying in an area where the "direct route" can be used. If the state is good, the process proceeds to step S3. If the state is poor, the process proceeds to step S4.

In step S3, the flight data of the drone 2 is subjected to data conversion by the FDR module 20 and sent to the information processing terminal 4B. That is, as illustrated in FIG. 4, the flight data received from an IF (interface circuit) of the sensor means 28 is subjected to data conversion by the CPU 25 and transmitted to the information processing terminal 4B. In the example of FIG. 1B, this flight data is sent from the information processing terminal 4B to the server computer 6 via the communication line 7, and processed and recorded. As described above, the drone 2 and the information processing terminal 4B are in an on-line state, and a drone pilot 3 can confirm the flight data on the information processing terminal 4B in real time. If an amount of information is large, cloud computing used by the information processing terminal 4B can also be used. The IF (interface circuit, hereinafter referred to as "IF") may adopt an IF corresponding to a physical cable (communication in I2C or SPI) or wireless communication (Bluetooth (registered trademark), Wi-Fi (registered trademark) and the like) which communicates with the drone 2.

In step S4, the flight data of the drone 2 is subjected to data conversion by the CPU 25 and recorded in the memory 26 of the FDR module 20. Since the drone 2 and the information processing terminal 4B are in the off-line state due to the poor signal state, they are temporarily recorded in the memory 26. In step S5, it is determined whether the signal state has been restored. If it is restored, the process proceeds to step S6. If it has not been restored yet, the process returns to step S4.

Since the signal state has been restored in step S6, the flight data recorded in the memory 26 is sent to the information processing terminal 4B. This flight data is sent from the information processing terminal 4B to the server computer 6 and processed and recorded. In step S7, it is determined whether the flight is completed, and in a case where the flight is not yet completed, the process returns to step S2, and in a case where the flight is completed, the recording of the flight data is ended.

The above steps were explained with the "direct route". However, it is not limited thereto. The constant recording of position information and/or posture information of the drone 2 is also performed in the "route via server". It is possible for the drone 2 to record flight data outside an area limited in the distance where the radio wave reaches (for example, an area where Wi-Fi (registered trademark) radio wave does not reach). In this case, the flight data of the drone 2 is sequentially recorded in the memory 26 of the FDR module 20 in step S4. Further, in step S5, it is determined whether or not the flight data can be transmitted to a transceiver 5. When the flight data can be transmitted, the flight data is recorded in the server computer 6 via the transceiver 5. As a result, the drone pilot 3 can confirm the flight data on the portable terminal 4B via the communication line. Further, the drone pilot 3 can manage a plurality of drones 2 with one information processing terminal 4B by recording necessary application programs in the server computer 6. That is, in the case of performing recording in the "route via server," information communication can be carried out even outside a range of Wi-Fi (registered trademark), and a plurality of drones 2 can be managed at the same time.

Figure 6A:
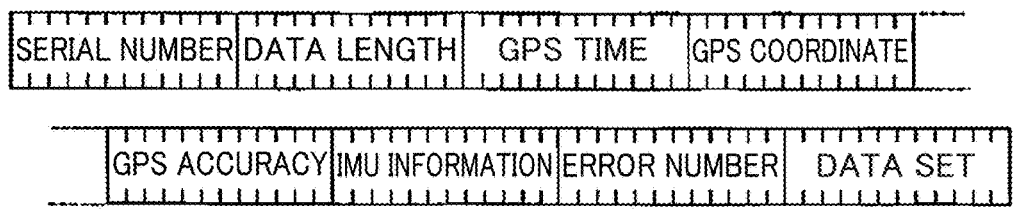
FIG. 6A is a diagram illustrating an example of a configuration of flight data.

FIG. 6A is a diagram illustrating an example of a configuration of the flight data. The flight data is packetized, and each data packet is constituted by, for example, a serial number, a data length, a GPS time, a GPS coordinate, a GPS accuracy, IMU information, an error number (also referred to as an "error code"), a data set (for example, a class structure when the data is held in the memory) and the like. Here, the IMU information includes acceleration, angular velocity, angle, and the like, which are flight data of the drone 2. The error number and the data set can be arbitrarily set depending on a specification of the drone 2 on the side of the fuselage. The data set is a variable length. This packet data can be encrypted as necessary. Since the serial number is attached to the packetized flight data, the flight data directly transmitted from the drone 2 to the information processing terminal 4B in step S3 and the flight data delayed and transmitted in steps S4 to S6 can also be recorded as a series of data by the server computer 6. Alternatively, the flight data may be recorded in correspondence with a time code by the CPU 25. In this case, for example, processing is performed on the basis of the time code by the server computer 6 and recorded as a series of data.

Figure 6B:
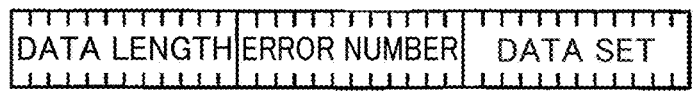
FIG. 6B is a diagram describing a data configuration of a packet in the case of using cloud computing.

FIG. 6B is a diagram describing a data configuration of the packet in the case of using cloud computing. The information sent by communication can be added after module information of a page of the data packet to be raised to the cloud.

By mounting the FDR module 20 on the drone 2, the flight data including position information and/or posture information of the drone 2 during flight can be recorded constantly. It is not necessary to constantly connect the drone 2 and the information processing terminal 4B, and if power is supplied to the FDR module 20 as a minimum, it is possible to constantly record the flight data of the drone 2.

By constantly recording the flight data, there are secondary effects as described below.

Figure 6C:
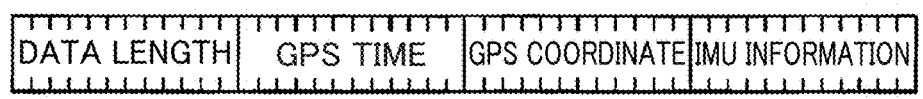
FIG. 6C is an example of a data structure for transmitting information of a certain type of sensor which is not mounted on a drone 2.

(1) In the "Direct route," unexpected flight (position, posture, and the like) of the drone 2 can be detected in real time.
(2) The flight data can correspond to images, error signals, and the like sent from the drone 2.
(3) In development stage of the drone 2, the flight data obtained from the FDR module 20 can be used for debugging and the like of programming flight control and/or posture control of the drone 2.
(4) By performing a post analysis on the flight data, the analysis can be used to modify and improve hardware and software controlling the drone 2.
(5) In the event of an accident in the drone 2, it is possible to investigate a cause of the accident and to specify a location of crash by analyzing the flight data.
(6) The flight data obtained from the FDR module 20 can be used for developing a collision prevention technique of the drone 2.
(7) For the drone 2 where certain type of sensor (for example, GPS) is not mounted, by mounting a basic sensor (GPS, IMU and the like) in advance on the sensor means 28 of FIG. 4, it is possible to provide data (for example, packet data as illustrated in FIG. 6C) of the sensor which is not mounted on the drone, thus improving flight data accuracy and ensuring reliability and the like. Alternatively, the data from this preliminary sensor is provided to the data of the mounted sensor, such that a measurement error may be reduced to improve an accuracy and the two sensors may be used to secure redundancy (improve reliability), and the like. That is, as communication to the drone 2, for example, a sensor value of the GPS and the like may be provided to the drone 2 where a sensor of the GPS and the like is not mounted or a value may be obtained so as to be utilized as a preliminary sensor of the GPS and the like. Then, the aforementioned data can be obtained on the side of the drone 2 (for example, I2C or Wi-Fi (registered trademark) and the like).
(8) The flight data recorded in the server computer 6 can be managed on the net by establishing a link on the Internet.

The flight control command transmitted from the information processing terminal 4B to the drone 2 based on the flight data obtained by the FDR module 20 may be absolute control that gives GPS coordinates of a destination or relative control that gives a difference between the destination and a current position obtained from the flight data.

Figure 7A:
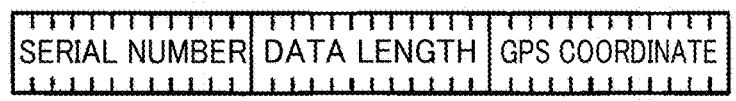
FIG. 7A is an example of a data structure in a case where a flight control command is performed by absolute control.
Figure 7B:
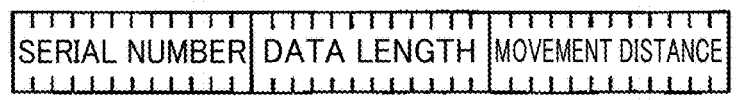
FIG. 7B is an example of a data structure in a case where a flight control command is performed by relative control.

FIG. 7A is an example of a data structure in the case of the absolute control. FIG. 7B is an example of a data structure in the case of the relative control. Specifically, for example, in a case where the FDR module 20 is connected to the drone 2, the drone pilot 3 can issue a pilot instruction. Therefore, the drone 2 can perform control remotely via I2C, Wi-Fi (registered trademark) or the like. In addition, as the control, there are absolute defense that gives the GPS coordinates of the destination and relative control indicating the difference.

Figure 7C:
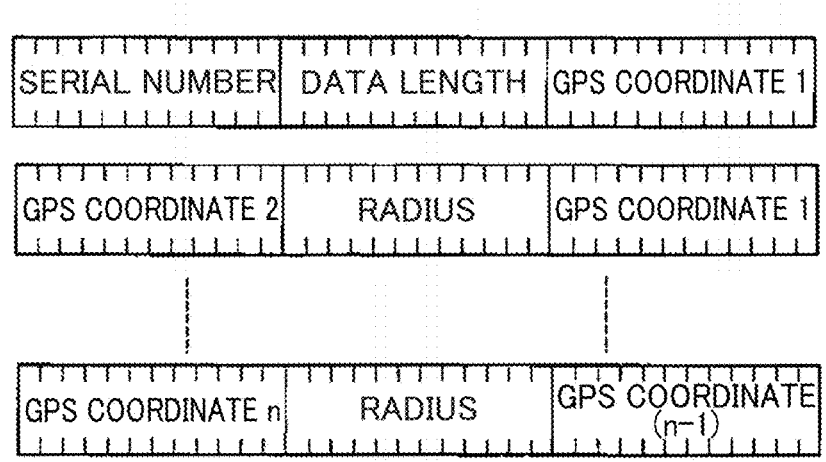
FIG. 7C is an example of a data structure of command information sent to a drone in inertia control of the drone.
Figure 7D:
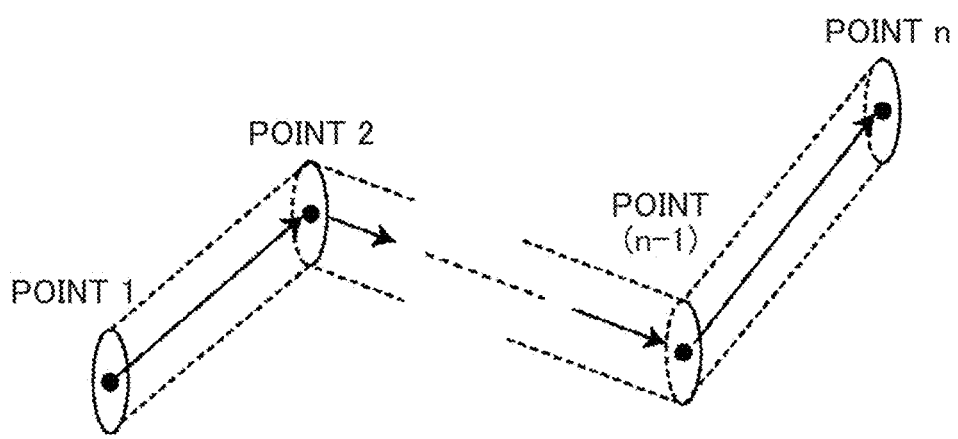
FIG. 7D is a diagram describing an image realizing control by setting a virtual route to prevent collision.

The flight data obtained from the FDR module 20 can be utilized for collision prevention means. In the event of an age where massive drones 2 fly, it is expected that it will be necessary to control the drones in the same manner as aircrafts. A remote autopilot function may not be able to handle detailed missions. Therefore, in order to prevent collision in long distance flight, a virtual route may be set to realize the control. For example, as illustrated in FIG. 7D, in a case where the flight position of the drone 2 aims at a point n from the point 1 via points 2, 3 and a point (n−1) (n is an integer value of 2 or more), a path of a tubular drone 2 area (indicated by the broken line in the figure) that takes into consideration the size of the drone 2, misalignment during flight due to air current and the like, and errors is determined and an intersection with other drone 2 areas is prohibited in advance. As a result, it is possible to prevent the drone 2 from colliding with another drone 2 in advance. By updating the points 2, 3 and the point (n−1), which are the flight positions of the drone 2, sequentially according to the position information of the drone 2 in flight and resetting the drone 2 area, a reliability of preventing the collision is improved. FIG. 7C is an example of a data structure of command information sent to the drone 2. Specifically, for example, in the event of the age where massive drone 2 fly, it is considered that it becomes necessary to control the drones in the same manner as aircrafts. However, with the remote autopilot function, there is a possibility that detailed mission cannot be completed. Therefore, in order to prevent collision in the long distance flight, a virtual route may be set to realize the control. That is, a route obtained by connecting a plurality of tubular shapes obtained by giving a radius to a flight path between two points such as point 1 and point 2 is indicated, which may be utilized for the collision prevention.

The FDR module 20 may be utilized for collaboration of abnormality detection. When the abnormality of the drone 2 is detected, such as in a case where a variation of data of IMU information such as acceleration continuously increases or in a case where the drone 2 is turned upside down due to angle information or the like, more detailed IMU information may be acquired to provide the pilot 3 with the flight data at the time when the abnormality occurs. That is, the "abnormality" is recognized, for example, when the variation in the value of IMU (acceleration and the like) increases continuously or when the angle information and the like is turned upside down, whereby more detailed IMU information may be obtained and provided. In the present disclosure, the second embodiment has been described by taking a small unmanned aircraft (drone 2) as an example. However, the application of this FDR module 20 is not limited thereto. It is applicable to control of a robot by constantly recording data of a behavior and a posture of a robot equipped with an artificial intelligence. It is also possible to determine an abnormal state such as a state where the robot falls down and to record data such as position, behavior, and posture at that time in detail.

To summarize the aforementioned contents, when the communication is connected, the FDR module 20 continues to transmit information indicating the state via the application software of the information processing terminal 2 and the communication line 7, and when the communication is not connected, the FDR module 20 holds therein the information indicating the state and transmits the same together when the communication is connected. Further, for example, log data recorded in the FDR module 20 may be recognized from the portable information processing terminal 4B or may be subjected to a cloud management when information amount of the log is large.

In addition, in this case, at the time of off-line, the FDR module 20 may hold therein the information and transmit the log to the cloud or the like at the time of on-line. In connection with the connection between the drone 2 and the information processing terminal 4B, when it is desired to cooperate with an error number, an image and the like transmitted from the drone 2, such cooperation may be realized by performing a connection using a terminal or a connection using a connection method such as Wi-Fi (registered trademark), Bluetooth (registered trademark).

Further, since the communication method (communication mode) may be different depending on the type of the drone 2, customization may be performed as necessary. The keywords in the second embodiment are the flight recorder, remote operation, abnormality detection, log, control navigation, and the like.

Further, the following update is assumed for the FDR module 20. As described above, it is possible to perform the analysis when there is an accident in the drone 2, and it is possible to detect a situation (for example, start of a sudden drop) immediately before the accident and changes to a mode to acquire the log with high temporal resolution, thereby contributing to investigation of cause of the accident. In a case where the log is acquired even during normal times, there is a risk that the amount of data may be enormous.

Further, for example, in a case where a recorder is mounted on the drone 2, it is also possible to recognize reaction to an external situation such as wind blowing and confirm a basic performance. Further, for example, in many cases, (1) an "accident (disturbance such as gust)," (2) a "sensor value", and (3) a "result (breakage due to crash)" occur in this order, it is difficult to grasp the cause from the result in that case. Therefore, updating is assumed in order to cope with such cases.

Further, the communication control apparatus to which the present invention is applied is not limited to the above-described second embodiment, and various embodiments including the following configurations may be taken. That is, the information processing apparatus to which the present invention is applied is an information processing apparatus including a storage medium for constantly recording movement data of a moving body (for example, the drone 2) operated by another information processing apparatus (for example, the portable terminal 4) and being capable of being mounted on the moving body, the information processing apparatus including:

a communication state determining means that determines a communication state between the information processing apparatus and another information processing apparatus; and a transmission time control means that performs a control of transmitting the movement data of the moving body to the another information processing apparatus in a case where it is determined by the communication state determining means that the communication state is good, storing the moving data in the storage medium in a case where it is determined by the communication state determining means that the communication state is poor, and thereafter transmitting the movement data stored in the storage medium to the another information processing apparatus in a case where it is determined that the communication state is good. Thus, at the time of on-line, moving data can be confirmed by the information processing terminal 4B or the like, and cloud management can be performed in a case where the information amount is large. Further, the movement data may be held in the drone 2 at the time of off-line, and the movement data can be transmitted to the information processing terminal 4B or the like at the time of on-line.

THIRD EMBODIMENT

Safety Control

Since a drone where a camera is mounted can photograph from the sky, in automatic control of the drone, it is an important technique to identify a place where it is good for the drone to enter, a place where it is not good for the drone to enter, a place from which the drone should not go any further and the like as a function to avoid a specific area such as a confidential designated place for national security in terms of protecting personal privacy and ensuring safety. In view of this, the third embodiment intends to provide a drone 2 including a simple means that prevents intrusion into a specific area or prevents flight from a specific area to the outside. Further, the drone 2 of the third embodiment can indicate a recommended route in addition to the indication of not being able to come out or enter, or indicate a place where an emergency landing is possible.

Figure 8A:
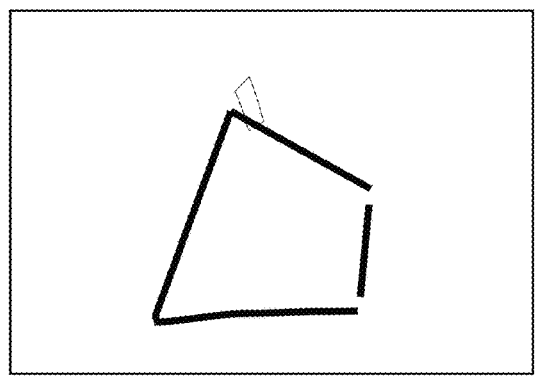
FIG. 8A is a diagram describing safety control performed by enclosing a specific area with a tape or the like of a predetermined color.
Figure 8B:
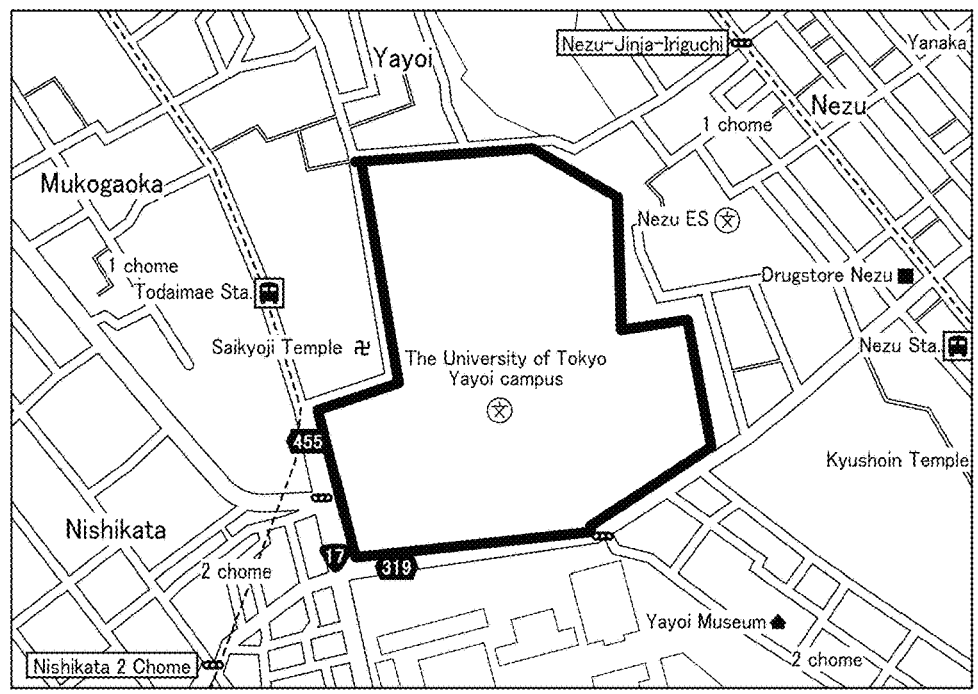
Figure 8C:
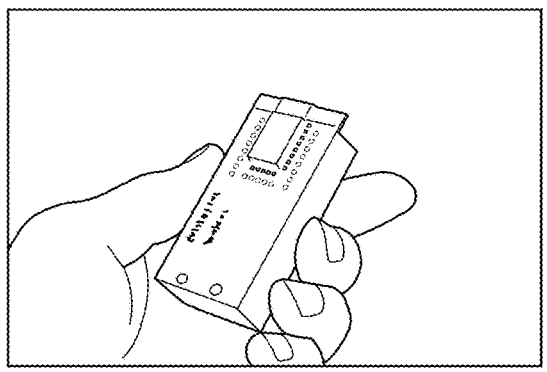
FIG. 8C is a diagram describing safety control performed by mounting a BLE beacon device that continuously oscillates a constant signal.

As illustrated in FIG. 8A, the first method is performed by enclosing a specific area with a tape or the like of a predetermined color. The drone 2 recognizes a specific area from a tape or the like using an mounted camera (not illustrated), calculates relative coordinates from a current flight position (GPS information) of the drone 2 to the specific area, and is subjected to a pilot control so as not to intrude into the specific area. Even when the drone crashes, it is controlled to avoid the specific area. The pilot control is realized by an application program organized so as to avoid the specific area. On the contrary, it is possible to prevent the drone 2 from flying from the specific area to the outside. In a case where the drone 2 is to be flying at places where GPS information is weak such as indoors, a stereoscopic environment map may be created and used at high speed by the onboard camera of the drone. By enclosing an area with a tape of a specific color as illustrated in FIG. 8A, it is possible to convey information such as information regarding not going out from or entering a range of the area. FIG. 8A is a photograph, but it is possible to use the tape, if it is thick, even outdoors. It is also possible to execute image recognition with a camera→calculation of relative coordinates from self-position of the drone 2→control so as not to enter the range, and the like. In a second method, as illustrated in FIG. 8B, a specific area is not specified by an actual place, a building or the like, but is defined by map information. For example, a stereoscopic map is created at high speed by the onboard camera of the drone, and specific area information is given to the stereoscopic map. A method of prohibiting entry into a specific area or prohibiting flying from the specific area to the outside is the same as in the first method. If the enclosure is registered so as to be associated with GPS information on a map or the like as illustrated in FIG. 8B, it is possible to control so as not to enter into or go out from the enclosure when the drone 2 flies around the enclosure. The drone 2 can be realized by downloading information of prohibited areas around the self-position obtained by the GPS information. In a third method, as illustrated in FIG. 8C, a Bluetooth (registered trademark) Low Energy (BLE) beacon device that continuously oscillates certain signal is mounted, and a control is performed so as not to intrude into an area within certain distance (within a specific area) from the signal source. In contrast, a control is performed so as not to fly from an area within the certain distance from the signal source to the outside. There is a device which continues to emit radio (beacon) according to the Bluetooth (registered trademark) standard. According to this standard, it is possible to realize a technology capable of calculating a distance from the device that emits the beacon.

If this technology is utilized, it is possible to use a device which informs the drone 2 that a wireless shield is present (FIG. 8C). That is, if the receiver of Bluetooth (registered trademark) mounted on the drone 2 continues to capture the distance of the device emitting the beacon while moving, coordinates of a position where the beacon exists can be calculated. Based on this calculation, the movement of drone 2 can be limited by executing the following process (1) or (2).

(1) A beacon command carrying a command of not being within 50 meters is notified
(2) A beacon ID is searched from the Internet, and a limitation condition is confirmed The aforementioned first to third methods may be adopted alone or in combination. In all the first to third methods, it is also possible to perform a conversion into GPS coordinates or relative coordinates with the drone 2 itself for processing.

According to the third embodiment, it is possible to prohibit the drone 2 from entering a specific area or to prohibit the drone 2 from flying from the specific area to the outside.

By applying this, it is possible to avoid areas such as people, roads, and schools, and to go down while avoiding the people at the time of landing or crash. This can be realized by creating a stereoscopic map at high speed by the mounted camera and giving specific area information on the map, thus recognizing the specific area to be avoided.

Using this technique, a distance is measured or a 3D map is created from image data collected from the camera facing a ground at the time of landing, such that it is possible to land while avoiding areas such as protrusions including people, automobiles, and houses, slopes, grooves, and the like which are not appropriate for landing.

Using this technology, when moving, it is possible to recognize white lines and yellow lines on a road from camera image data, recognize that color of asphalt on the road exists in a linear combination or recognize places such as roads in advance from advance information by a map and the like, thereby avoiding their sky or minimizing the time to stay in the sky.

Further, the information processing apparatus to which the present invention is applied is not limited to the above-described third embodiment, and various kinds of embodiments including the following configurations may be taken. That is, the information processing apparatus to which the present invention is applied is mounted on a moving body (for example, the drone 2) operated by another information processing apparatus (for example, information processing terminal 4B), the information processing apparatus including:

a flight area recognition means that recognizes a specific area as a flight-enabled area and recognizes an area other than the flight-enabled area as a flight-prohibited area; and
a control means that calculates relative coordinates of a position to the movement-enabled region with respect to a current position of the moving body and executes a control not to allow the moving body to enter the movement-prohibited area.

Thus, it is possible to prevent the drone 2 from intruding and withdrawing from an arbitrary area, to indicate a recommended route, or to indicate a place where emergency landing is possible.

FOURTH EMBODIMENT

Laser Track and the Like

Conventionally, a drone is piloted with a dedicated transmitter. However, it is convenient in many ways to pilot the drone with a device other than the dedicated transmitter.

For example, it is possible to pilot the drone with sound. A microphone mounted on the drone 2 reacts to a specific frequency such as sound from a whistle or a speaker, such that the drone 2 moves to take off or land. That is, a sound source such as the whistle or the speaker sends a command to the drone 2 without using a dedicated transmitter. In particular, it is easy to manipulate the drone 2 with a specific sound, and it is useful if an emergency landing command may be transmitted to the drone 2. Further, a command such as a command of moving to the left and right according to patterns of various sounds is transmitted, whereby it is also possible to pilot without a portable terminal such as the information processing terminal 4B. Phenox 2 has a function to recognize a whistle sound (3200 Hz) with a microphone and take off or land. Although there are some examples of piloting by speech recognition, a propeller is noisy and in order to utilize the microphone of the drone 2, one with high cognitive ability such as the whistle is considered to be effective. In addition, 3200 Hz is a pitch that does not interfere with a pitch of the propeller of Phenox 2,and the frequency varies depending on a fuselage. An image recognition of the laser may be replaced with a whistle and a microphone and a command may be sent.

Figure 9:
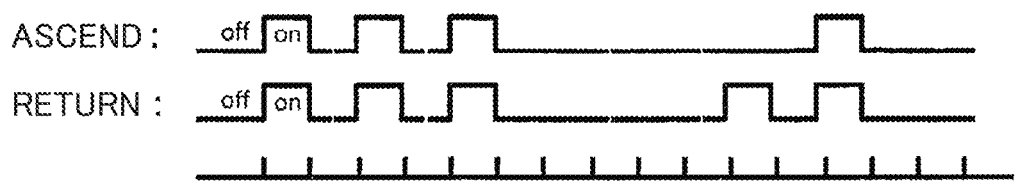
FIG. 9 is a view describing an example of piloting a drone 2 by transmitting pilot information (for example, an ascending command or a return command) to the drone according to light emission patterns by setting a plurality of light emission patterns of laser light.

Further, it is possible to pilot with a light ray. For example, a light source (including visible ray and invisible ray) like a laser pointer is captured and tracked automatically with the onboard camera of the drone, whereby it is possible to pilot the drone 2 without using a dedicated transmitter. In this case, in a case where the drone 2 loses sight of a laser pointer light source, a light ray in a blinking pattern is emitted from the drone 2 or the drone 2 moves in a predetermined way (for example, turning of the drone 2 and the like), whereby a pilot is notified of the situation where the laser pointer light source is lost sight of. Further, the behaviors when the taking-off or landing is performed or the pointer is lost sight of may be communicated with the blinking pattern or gesture. Light is emitted from a dedicated laser pointer toward a wall surface or a ground. In the case of the ground, it is possible to change a location of hovering with a camera facing downward. Further, in the case of the wall surface, it is possible to change altitude and the like with a horizontal camera. Further, multiple lasers can be used in combination. In image information of the onboard camera of the drone, red visible light laser is inconspicuous in a case where there are many red colors in the surrounding environment (for example, a background is sunset). On the other hand, green visible light laser is inconspicuous in a case where there are many green colors in the surrounding environment (for example, the background is forest). Therefore, for example, the red visible light laser and the green visible light laser are adopted at the same time as parallel rays for the laser, whereby it is possible to easily recognize one of the laser lights, improving a reliability of tracking. In other words, by allowing two of the red visible light laser and the green visible light laser to light up at the same time, it was difficult to control with the red laser on a red wall and the like or a red color in the background was misidentified as recognized image in some cases, but accuracy may be improved by looking for points where the two colors are side by side. In the case of using three or more types of laser lights, the reliability is further improved. Further, other types of light rays (for example, an infrared ray) may be used. By using three or more colors or the infrared ray together, a range of utilization may be expanded. In addition, it is possible to use a light emission (lighting) pattern of the laser light. As illustrated in FIG. 9, by setting a plurality of light emission patterns of the laser light, pilot information (for example, an ascending command or a return command) may be transmitted toward the camera of the drone 2 by the light emitting patterns. Further, a plurality of colors of the laser light may be set to transmit the pilot information (for example, an ascending command or a return command) to the drone 2 by the light emitting patterns. Further, the emission patterns of the laser light and the colors of the laser light may be combined to transmit the pilot information to the drone 2. Here, the lasers of plural colors may blink in the same way, but it is also possible to send a more complicated command by changing the blinking pattern depending on the color.

Further, the information processing apparatus to which the present invention is applied is not limited to the above-described fourth embodiment, and various kinds of embodiments including the following configurations may be taken. That is, the information processing apparatus to which the present invention is applied may include a frequency operation control means that executes control for operating a moving body based on a command to the moving body (for example, the drone 2 or the like) including at least a landing command corresponding to a sound of a specific frequency.

As a result, the moving body such as the drone 2 can take off or land by recognizing the sound with the microphone. Further, the information processing apparatus to which the present invention is applied may include an automatic operation control means that executes control for operating the moving body by capturing and automatically tracking a specific light source with an imaging unit mounted on the moving body.

As a result, the moving body such as the drone 2 captures and automatically track a light ray of a laser pointer and the like by the camera (imaging unit), whereby it is possible to perform piloting without the dedicated transmitter. Further, the information processing apparatus to which the present invention is applied may include a light emission pattern operation control means that executes control to operate a moving body (for example, the drone 2) based on a light emission pattern of the laser light. Thus, it is possible to send a more complicated command.

FIFTH EMBODIMENT

Securing Universality (Software Aspect) (Hardware Aspect)

Conventionally, the drone has been developed as a dedicated machine for military purpose, relief purpose, commercial purpose and so on. Meanwhile, since the drone is under development, a specification of the drone is frequently updated (version upgrade). Therefore, it becomes impossible to use depending on application or a complicated usage scene such as assignment or lending is assumed. At that time, a scene where a fuselage of the drone or a robot itself and an application are utilized in different combinations is conceivable. A platform that can cope with the scene was designed. However, from an economic aspect and the like, it is desirable for one drone to change in its application or cope with a plurality of applications. It is also desirable that the drone be always subjected to the version-up and have the latest specification. Contractors who lend and maintain the drone in each area lend a fuselage to users having purposes, and each user can achieve his purpose by utilizing the application suitable for the purpose of each user. Therefore, the fifth embodiment intends to provide a platform which can easily cope with providing the fuselage of the drone 2, changing the application of the drone 2 and the version-up.

Figure 10:
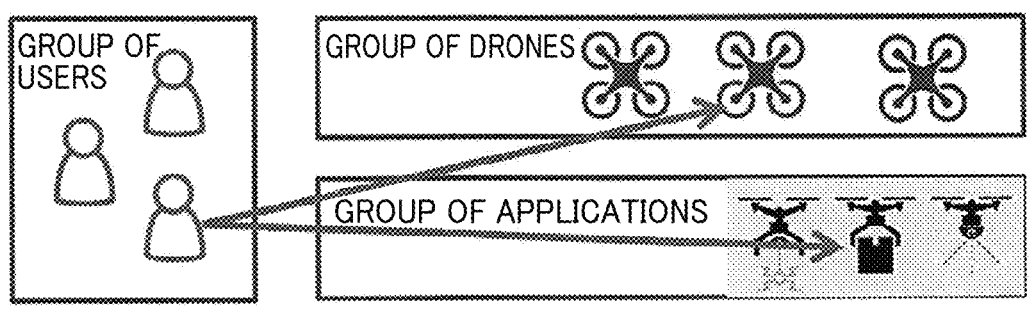
FIG. 10 is an image for describing an overview of a platform that can easily cope with provision of a fuselage of a drone 2, change of use of the drone and the like, and version-up.

FIG. 10 is an image for describing an outline of a platform that can easily cope with providing the fuselage of the drone 2, changing the application of the drone 2, and the version-up. A registered user can select a set of a fuselage of a desired drone 2 (including a portable terminal for piloting and the like) among a group of the drones 2 and an application program suitable for the purpose. A platform provider incorporates the application program in the selected drone 2 and provides it to the user. The user can select both the fuselage and the application in a free combination. Unlike Android Market (registered trademark) of mobile phones and the like, a model itself can be selected. In addition, the provided application program has been updated, and it is possible to download an update program from the platform even once it is handed over to the user. It is necessary to make a safe mechanism in order to download the program freely, be able to carry out arbitrary business of the operator, and prevent different movement when skipped, and the like. It is possible to realize a web platform which can be downloaded like application market of a mobile phone while managing operators. For the drone 2, a universal port such as USB is prepared and necessary modules as physical or electric circuits are connected, whereby it is possible to add or modify functions for one drone 2 and use the drone for many purposes.

In the fifth embodiment, it is possible to provide a drone 2 that can be applied to various applications. For example, it is possible to provide a drone 2 that can be applied to logistics transporting goods, salvation giving lifesaving tools, distress searches for searching for missing people using a thermo camera, agricultural survey using an infrared camera, and the like. Further, the user can share the drone 2 with a plurality of people without purchasing it. Further, an advantage of this platform is that it can conduct a certain review at the time of user registration and sequentially obtain user information to manage users, if necessary. For hardware, it can be connected by any connector. As a result, the hardware necessary for the application may be arbitrarily added. As a shape of the connector and the like, a universal one may be utilized or a new shape using encryption of a communication signal or the like may be adopted.

Further, the information processing apparatus to which the present invention is applied is not limited to the aforementioned fifth embodiment, and various kinds of embodiments including the following configurations may be taken. That is, the information processing apparatus to which the present invention is applied includes an application operation control means that executes control to operate a moving body (for example, the drone 2) via sets of 0 or more application programs and 0 or more hardwares selected according to an application of the moving body.

As a result, a drone operator 3 may freely download the application program or freely combine the hardware, thereby realizing an arbitrary method of using the drone 2. Further, the drone operator 3 can select a free combination of both the fuselage (hardware) of the drone 2 and the application.

SIXTH EMBODIMENT

Landing Port

Taking-off and landing are inevitable in an operation of a drone. In particular, for the landing, there is a request on operations such as securing a safety and landing to a predetermined position, and the landing port is very important. Further, charging is important, and the operation can be smoothly performed if there is a mechanism that can be charged together with the landing port. Therefore, the present embodiment intends to provide a landing port which satisfies a request such as securing a safety and landing to a predetermined position, and capable of charging after landing.

Figure 11A:
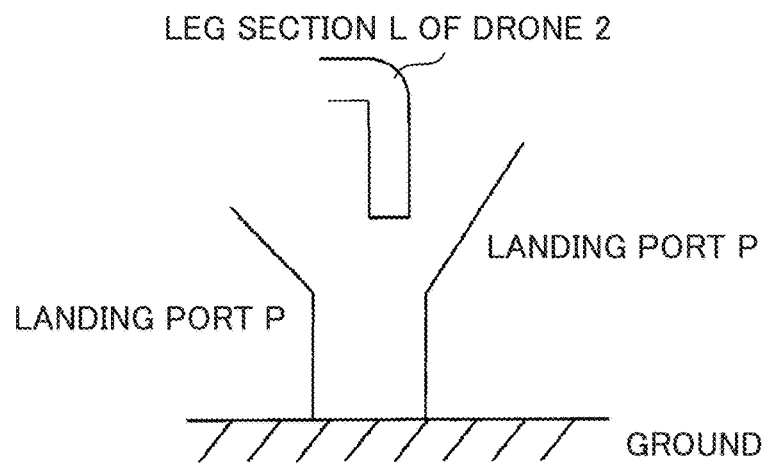
FIG. 11A is a diagram illustrating a cross-sectional shape of each landing port.
Figure 11B:
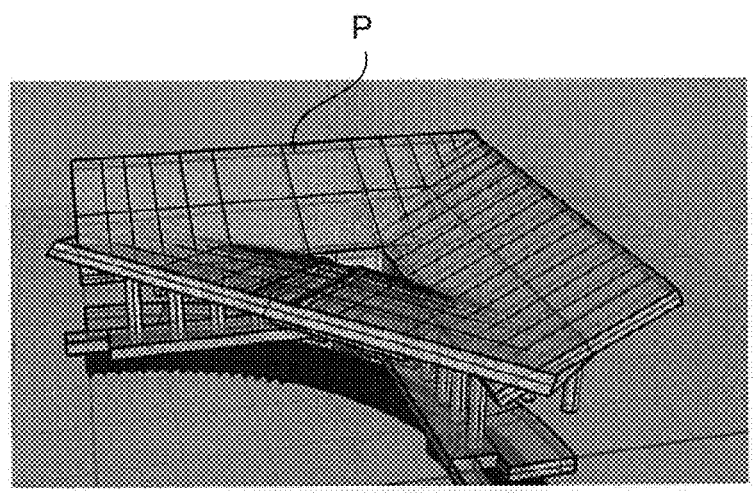
FIG. 11B is a perspective view of a landing port.
Figure 11C:
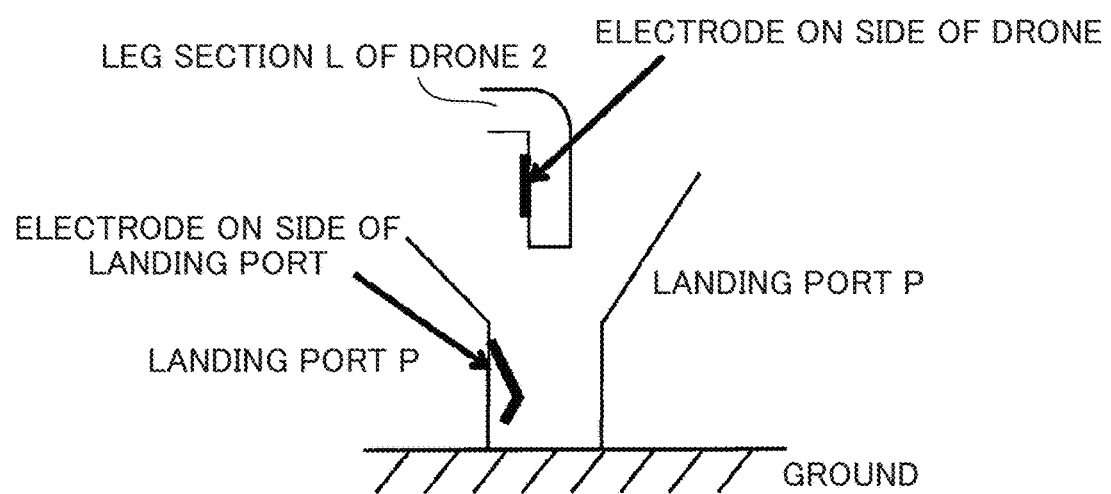
FIG. 11C is a diagram describing a charging method for a drone using a landing port.

A landing port assembly is constituted by a combination of a plurality of landing ports corresponding to the number of leg sections of the drone 2. FIG. 11A is a diagram illustrating a cross-sectional shape of each landing port P. The landing port P accommodating a leg section L of the drone 2 is a horn-shaped recess with an opening portion being widened. Therefore, even in a case where is some error at the time of landing of the drone 2, if it is within the opening, the error is corrected and the drone can land at a predetermined position. FIG. 11B is a plan perspective view of the landing port P. FIG. 11B is ¼ of the whole, and it is one leg section L of the drone 2. In a case where the number of the leg sections is not four, or the number is 2 or 6, a similar method may be used. FIG. 11C is a diagram describing a method of charging the drone 2 using the landing port P. After the landing, an electrode on the side of the drone 2 and an electrode on the side of the landing port are brought into sliding contact with each other, whereby power feeding is started. In the case of a large drone 2 having a large charging current, the electrode on the side of the landing port may be pressed against the electrode on the side of the drone using a motor (not illustrated) after landing.

As illustrated in FIGS. 11D to 11H, it is also possible to provide a projection B on a part of the landing port P.

Figure 11D:
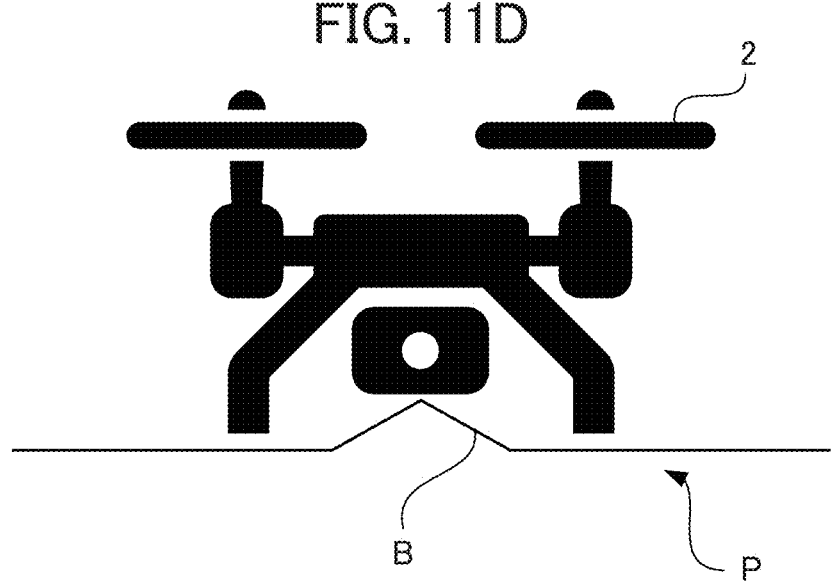
FIG. 11D is a view illustrating an example in a case where a projection is provided only in a central portion of a cross section of a landing port.
Figure 11E:
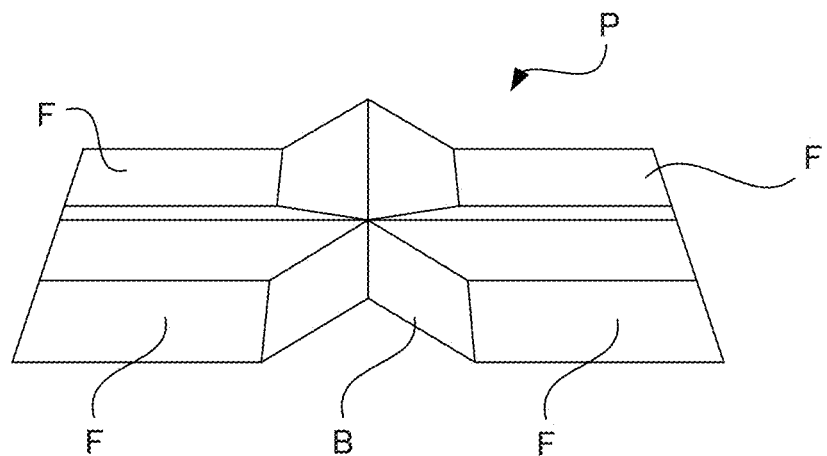
FIG. 11E is a planar perspective view illustrating a landing port having a cross-shaped projection.
Figure 11F:
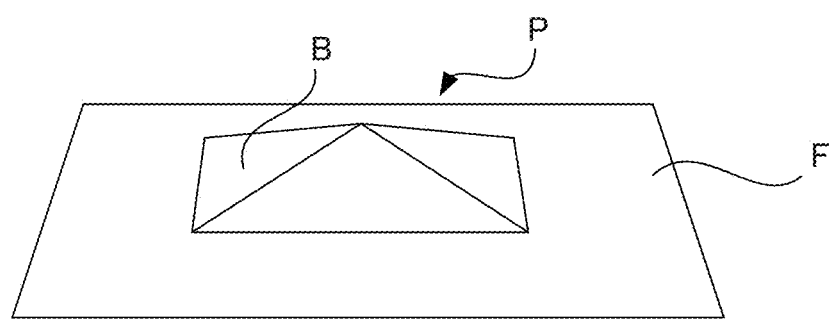
FIG. 11F is a planar perspective view illustrating a landing port having a square pyramidal projection at its center.
Figure 11G:
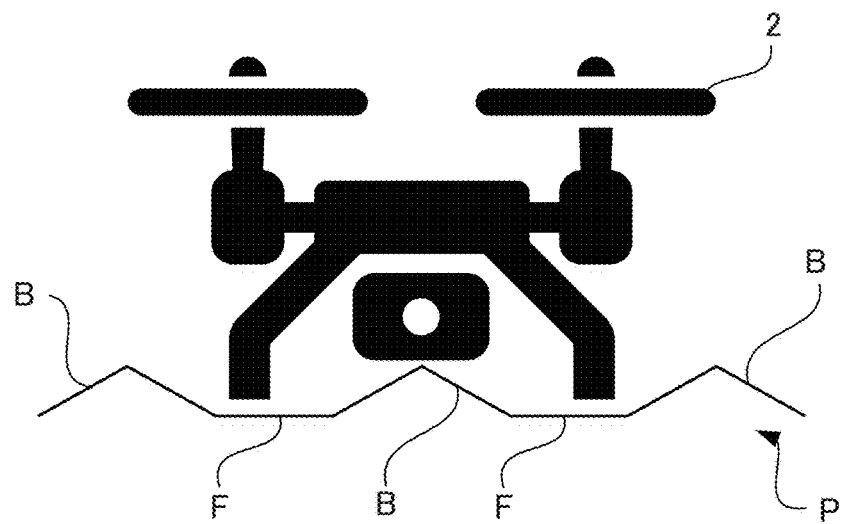
FIG. 11G is a view illustrating an example in which a projection is provided in each of a central portion and an end portion.
Figure 11H:
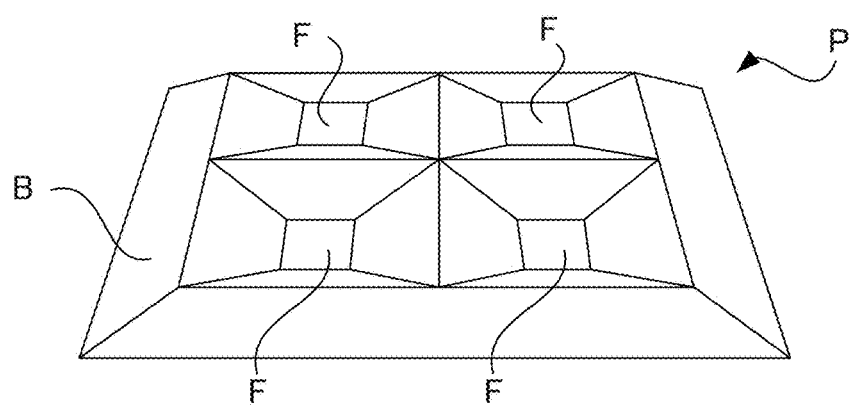
FIG. 11H is a planar perspective view illustrating a landing port having a projection at each of a central portion and an end portion.

FIG. 11D illustrates an example in a case where the projection B is provided only in a central portion of a cross section of the landing port P. FIGS. 11E and 11F are perspective plan views each illustrating a specific example of the landing port P illustrated in FIG. 11D. FIG. 11E is a plan perspective view illustrating a landing port P having a cross-shaped projection B. Further, FIG. 11F is a plan perspective view illustrating a landing port P having a projection B in a square pyramidal shape at its center portion. As illustrated in FIG. 11E, since the landing port P having the cross-shaped projection B has four planar sections F formed in a depression by the cross-shaped projection B, the landing port P is appropriate as a landing port for the drone 2 having four leg sections. As described above, the drone 2 measures a distance or creates a 3D map from image data collected from the camera facing a ground at the time of landing, such that the drone 2 can land while avoiding areas such as protrusions including people, automobiles, and houses, slopes, grooves, and the like which are not appropriate for landing. Therefore, as illustrated in FIGS. 11D to 11H, at least the following advantageous effects may be obtained by providing the projection B on a part of the landing port P. In other words, since the drone 2 can easily recognize the image data collected from the camera, convenience in creating a 3D map can be improved. Further, even in a case where the leg section of the drone 2 lands somewhat out of the original landing portion when the drone 2 lands on the landing port P, the drone 2 naturally slides down an inclined surface of the projection B of the landing port P due to its own weight, thus consequently being guided to an appropriate landing site on the landing port P. Therefore, a landing port P having a projection B at each of its center portion and end portion as illustrated in FIGS. 11G and 11H has a high effect of guiding the drone 2 to an appropriate landing site by an inclined surface of the projection B of the landing port P, compared to the landing port P having the projection B only in the central portion as illustrated in FIGS. 11D to 11F. The landing port P illustrated in FIGS. 11E and 11H assumes a case where the number of leg sections of the drone 2 is four, but a case where the number of leg sections is other than four is also applicable. That is, even if the number of leg sections of the drone 2 is other than four, it is possible to provide the landing port P with a projection B where planar sections F each of which is appropriate for landing of the drone 2. For example, in the case of the drone where the number of leg sections is two, it is possible to provide a projection B forming planar sections F capable of efficiently guiding the drone 2 to an appropriate landing site via the two leg sections. Further, for example, in the case of the drone where the number of leg sections is six, it is possible to provide a projection B forming planar sections F capable of efficiently guiding the drone 2 to an appropriate landing site by the six leg sections.

Figure 11I:
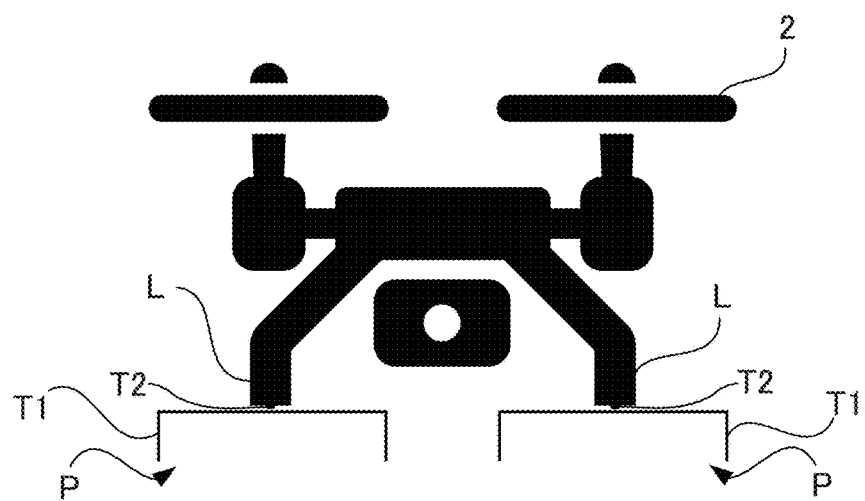
FIG. 11I is an image diagram illustrating an example in a case where the landing port is divided into a plurality of landing ports.
Figure 11J:
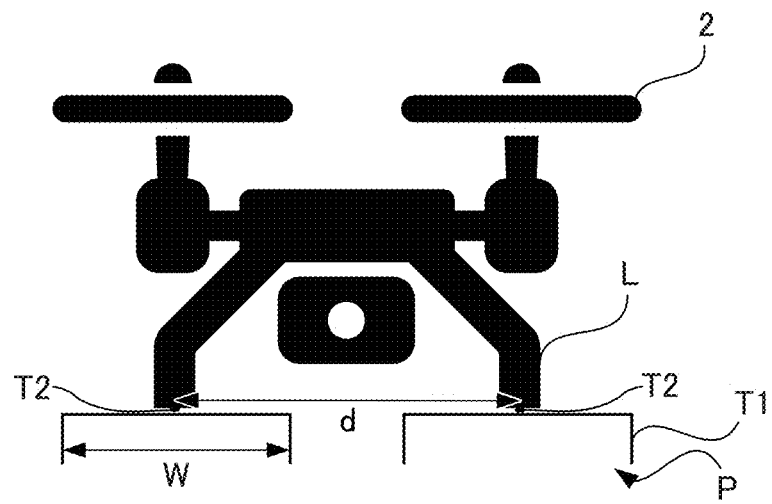
FIG. 11J is an image diagram illustrating a case where a width of each of the plurality of divided landing ports is shorter than the width of both leg sections of the drone.
Figure 11K:
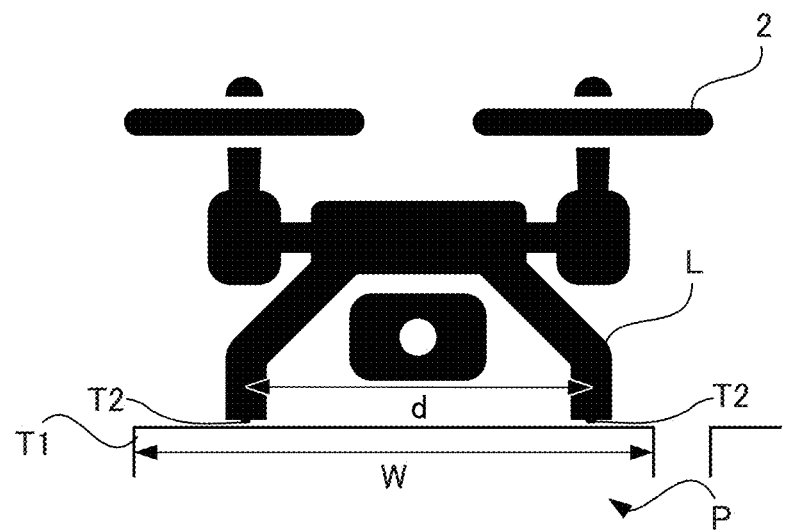
FIG. 11K is an image diagram illustrating a case where a width of each of the plurality of divided landing ports is longer than a width of both leg sections of the drone.

For example, as illustrated in FIGS. 11I to 11K, it is also possible to divide the landing port P into two ports and arrange a charging terminal T1 for the drone 2 in each of the divided landing ports P.

FIG. 11I is an image diagram illustrating a case where the landing port P is divided into two ports. In the case illustrated in FIG. 11I, since an error of about several cm occurs when the drone 2 lands on the landing port P, a charging terminal T1 for charging the drone 2 is arranged in a wide range where each of the plurality of leg sections L of the drone 2 may come into contact with the landing port P. For example, as illustrated in FIG. 11I, the charging terminal T1 on the side of the landing port P may be arranged over the entire surface of the landing port P.

Further, each of the charging terminals T2 on the side of the drone 2 is arranged in a point shape on each of the plurality of leg sections L of the drone 2. Therefore, the shape of the charging terminal T1 on the side of the landing port P is configured to have a circular shape or a rectangular shape that is wider than the shape (point shape) of the charging terminal T2. Thus, it is possible to cope with the error of several cm when the drone 2 lands on the landing port P.

Further, as illustrated in FIG. 11J, a width w of the plurality of charging terminals T1 on the side of the landing port P is designed to be shorter than a gap d between the plurality of leg sections L of the drone 2. This is because if the width w is designed to be longer than the gap d, as illustrated in FIG. 11K, the two charging terminals T2 having different polarities on the side of the drone 2 may come into contact with one charging terminal T1 simultaneously, thus short-circuiting the battery of the drone 2. However, even in a case where the width w is designed to be longer than the gap d as illustrated in FIG. 11K, it is possible to avoid the short circuit by taking the following measures. That is, the short circuit can be avoided by providing a fuse (not illustrated) for avoiding the short circuit or providing a connection control unit that checks a voltage of the charging terminal T2 of a connection destination to determine whether the connection is appropriate or not, and controls the connection.

Although not illustrated, a circuit connected to the charging terminal T1 on the side of the landing port P is provided with a backflow prevention circuit. This makes it possible to cope with a case where the drone 2 lands in the opposite direction. In addition, the charging terminals T1 on the side of the landing port P can be arranged such that m (m is an integer of 2 or more) charging terminals T1 are arranged in two dimensions. As a result, it is possible to perform balanced charging by bringing a number of charging terminals T1 into contact with a charging terminal T2 on the side of the drone 2. As a result, it is possible not to exceed an allowable voltage of the battery mounted on the drone 2. In addition, it is also possible to divert a part of the charging terminals T1 to communication terminals for communication.

Figure 11L:
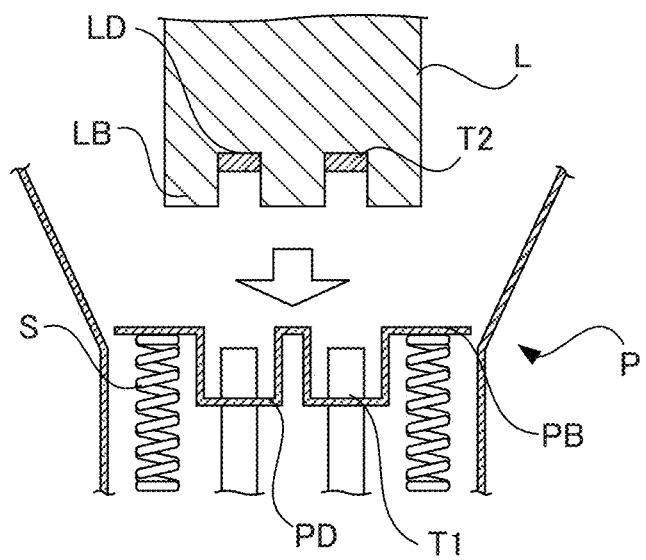
FIG. 11L is a view describing a vertical charging method in a case where a plurality of terminals are arranged on one leg section of a drone.
Figure 11M:
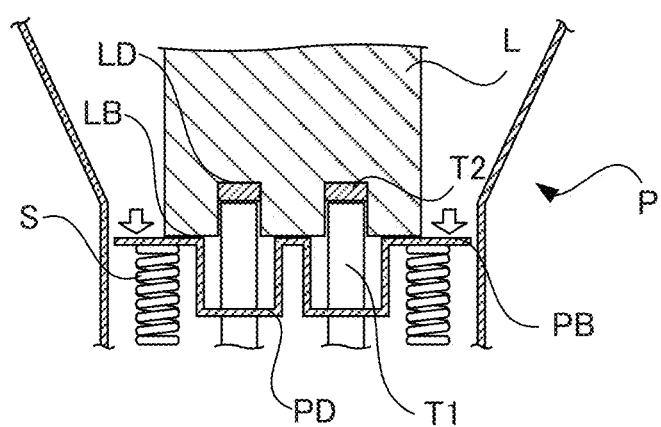
FIG. 11M is a view describing a vertical charging method in a case where a plurality of terminals are arranged on one leg section of a drone.

In the example illustrated in FIG. 11I and FIG. 11K described above, one charging terminal T2 is arranged for one leg section L of the drone 2, but this is merely an example. For example, a plurality of charging terminals T2 on the side of the drone 2 side may be arranged with respect to one leg section L of the drone 2. In this case, the charging terminal T2 on the side of the drone 2 is arranged near a bottom of the leg section L of the drone 2. Specifically, for example, as illustrated in FIG. 11L, a recess LD and a projection LB are provided in the bottom of the leg section L of the drone 2, and the charging terminal T2 is arranged so as to be buried in the bottom of the recess LD. As a result, since it is possible to prevent soil and dust from adhering to the charging terminal T2, whereby deterioration of the charging terminal T2 can be delayed. In this case, on the side of the landing port P, integrally molded recess PD and projection PB are provided, and a protruding charging terminal T1 is arranged in the bottom of the recess PD. Then, as illustrated in FIG. 11M, in a case where the drone 2 lands on the landing port P, when the leg section L of the drone 2 comes into contact with the projection PB on the side of the landing port P, the integrally molded recess PD and projection PB descend due to the weight of the drone 2. At this time, since the charging terminal T1 on the side of the protruding landing port P is fixed so as not to be interlocked with the descent of the recess PD and projection PB, it becomes exposed. The charging terminal T1 on the side of the landing port P is brought into contact with the charging terminal T2 on the side of the drone 2 while being surrounded by the recess LD provided in the bottom of the leg section L of the drone 2. The recess PD and the projection PB on the side of the landing port P descended due to the weight of the drone 2 ascend as the drone 2 takes off from the landing port P, and return to the original position. Therefore, the charging terminal T1 on the side of the landing port P is hidden again inside the recess PD on the side of the landing port P. As a result, since it is possible to prevent the charging terminal T1 on the side of landing port P from being exposed at all times, it is possible to prevent soil and dust from adhering to the charging terminal T1, whereby, deterioration of the charging terminal T1 can be delayed. A repulsive force of an elastic body such as a spring S may be used for descending and ascending the recess and the projection on the side of the landing port.

Figure 11N:
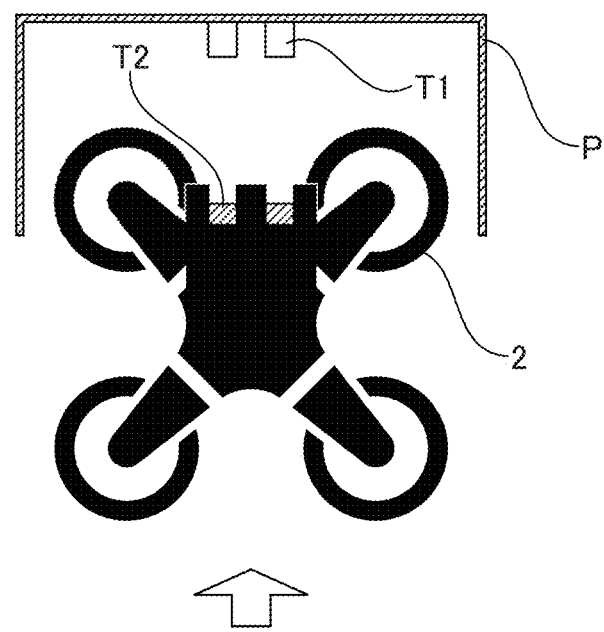
FIG. 11N is a view describing a horizontal charging method in a case where a plurality of terminals are arranged on one leg section of a drone.

Here, in FIGS. 11L and 11M, the charging terminal T1 and the charging terminal T2 are in contact with each other in the vertical direction by using the weight of the drone 2, but there is no particular need for the charging terminal T1 and the charging terminal T2 to be in contact with each other in the vertical direction, and they may be configured to contact with each other in any direction, for example, in the horizontal direction. FIG. 11N is an image diagram illustrating an example in a case where the charging terminal T1 and the charging terminal T2 are in contact with each other in the horizontal direction. In the example of FIG. 11N, the charging terminal T1 on the side of the landing port P is arranged on a vertical wall surface provided in the landing port P, and the charging terminal T2 on the side of the drone 2 is arranged on a part of a side surface portion of the drone 2. In this case, the charging terminal T1 and the charging terminal T2 contact each other in the horizontal direction. Therefore, unlike the cases of FIGS. 11L and 11M, it is not possible to utilize the weight of the drone 2 as a method of bringing the charging terminal T1 and the charging terminal T2 into contact with each other. In view of this, a floor surface of the landing port P in contact with the leg section L of the drone 2 may have a configuration such as a belt conveyor to enable a horizontal movement toward the charging terminal T1 or a configuration in which although not illustrated, the drone 2 can be automatically pushed toward the charging terminal T1 by a plate or a bar. Thus, the charging terminal T2 can be brought into contact with the charging terminal T1 in the horizontal direction. As described above, since the control accuracy is not perfect for the drone 2, it is assumed that an error of several cm occurs. Therefore, conventionally, it has been difficult to cause the drone 2 to automatically perform contact charging. However, it is possible to remarkably increase the accuracy of the contact charging by devising the shape on the side of the landing port P. That is, it is possible to safely and surely perform charging by bringing the charging terminal T2 on the side of the drone 2 into contact with the charging terminal T 1 on the side of the landing port P by configuring the shape on the side of the landing port P as described above. Further, in FIGS. 11L to 11N, the charging terminals T1 and T2 are disposed perpendicular to the drone 2 and the landing port P, but the angle at which the charging terminals T1 and T2 are disposed with respect to the drone 2 and the landing port P is not particularly limited. For example, the charging terminals T1 and T2 may be disposed so as to be oblique with respect to the drone 2 and the landing port P.

Further, the information processing system to which the present invention is applied is not limited to the above-described sixth embodiment, and various other embodiments including the following configurations may be adopted. That is, the information processing system to which the present invention is applied includes:

a moving body (for example, the drone 2) including an operating unit (for example, the converter module 10, the onboard communication means 15 of drown, the FDR module 20, a drive unit (not illustrated) and the like) operating on the storage battery, a proximal area (for example, a leg section L) that contacts or approaches the landing port (for example, the landing port P), and a power supply unit (for example, the charging terminal T2) arranged in the proximal area and supplying electric power for charging the storage battery; and the landing port on which the moving body lands, the landing port including a guiding area (for example, the projection B in FIGS. 11D to 11H) that guides the proximal area to a substantially predetermined position (for example, the planar sections F in FIG. 11E). As a result, even if there is some error, the moving body such as the drone 2 can land at the correct position. Further, as the charging method, the leg sections L of the moving body such as the drone 2 can be accurately taken and charged, so that charging can be started simultaneously with the landing of the moving body such as the drone 2.

Further, the guiding area may be a recess arranged in a part of a portion where the proximal area of the moving body may contact or approach.

In addition, the guiding area may be a projection arranged on a part of a portion where the proximal area of the moving body may contact or approach. In this way, it is possible to guide the moving body such as the drone 2 to the correct landing position even if there is some error by providing the recess or the projection as the guiding area in a part of the landing port P.

Further, the landing port includes
 a power feed unit (for example, the charging terminal T1) that supplies electric power to the moving body for each polarity, and
 a width of each of the power feed units may be shorter than a width between the plurality of power supply units having different polarities. As a result, it is possible to prevent short-circuiting of a battery mounted on the moving body such as the drone 2.

The landing port further includes, on a surface that approaches the proximal portion,
 a first projection (for example, a projection PB in FIG. 11L), and
 a power feed unit (for example, the charging terminal T1 in FIG. 11L) that is fixed independently of the first projection at a position lower than the first projection and supplies electric power to the movable body, and
the proximal portion further includes, on a surface that approaches the landing port,
 a second projection (for example, the projection LB in FIG. 11L) that contacts the first projection when the moving body lands on the landing port, and
the power supply unit (for example, the charging terminal T2 in FIG. 11L) at a position lower than the first projection, and
when the first projection and the second projection come into contact with each other, the first projection descends due to a weight of the moving body, whereby the power feed unit and the power supply unit come into contact with each other, and
when the first projection and the second projection are separated from each other, the first projection ascends by a repulsive force of the elastic body, whereby the power feed unit may return to the position lower than the first projection. As a result, since it is possible to prevent the charging terminal T1 on the side of the landing port P from being exposed at all times, deterioration of the charging terminal T1 may be delayed by preventing soil and dust from adhering to the charging terminal T1. In addition, since it is possible to prevent soil and dust from adhering to the charging terminal T2, deterioration of the charging terminal T2 may be delayed.

Further, the moving body
 may further include the power supply unit (for example, the charging terminal T2 in FIG. 11N) on a side surface portion of the moving body, and
the landing port may further include,
 on a surface that approaches the power supply unit, a power feed unit (for example, a charging terminal T1 in FIG. 11N) that supplies electric power to the moving body,
 a conveying unit that conveys the moving body until the proximal area and the landing port come into contact with each other, and the power feed unit and the power supply unit come into contact with each other when guidance is performed by the guiding area.

Thus, the power supply unit may be brought into contact with the power feed unit in the horizontal direction.

SEVENTH EMBODIMENT

Landing Proximity Technology

In a case where a drone flies toward a landing point, GPS information is used in a large range, but accuracy of the GPS information becomes a problem in the vicinity of the landing point. In view of this, the seventh embodiment intends to provide a landing signal generating device in which the drone 2 can accurately determine a position of a fuselage near the landing point. It is thought that a self-position of the drone 2 can be accurately estimated as relative coordinates with the landing point by mounting a plurality of signal transmitting devices with time information on the ground like GPS.

Figure 12:
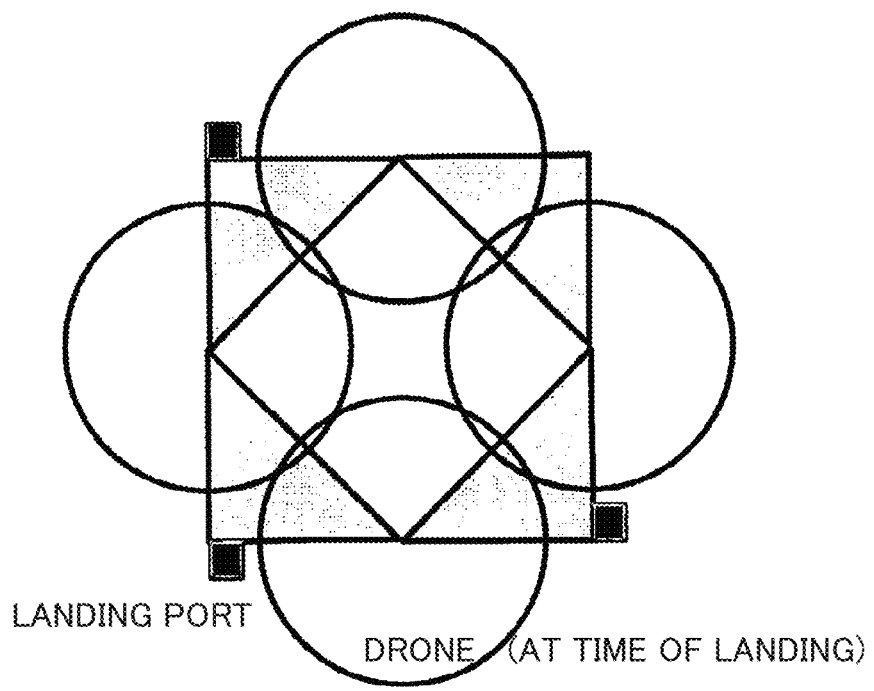
FIG. 12 is a view describing a landing signal generating device used for landing control of a drone.

As illustrated in FIG. 12, for example, three landing signal generating devices are mounted at the landing point in advance. The landing signal generating devices transmits time and position information instead of GPS satellites using the principle of GPS. The drone 2 can accurately determine a relative position of the fuselage from the landing signal generating devices based on the time and location information from the landing signal generating devices near the landing point, whereby the drone 2 can land correctly. In particular, for example, the landing signal generating device makes a wireless connection to a landing port via Wi-Fi (registered trademark) and the like, and issues a signal. Alternatively, the landing signal generating device detects proximity to a landing heliport based on GPS information and issues a signal via the Internet. As a result, an amount of movement of the moving body such as the drone 2 from the site to the landing can be accurately known. Here, there are three landing signal generating devices, but one or two may be used. In this case, one-dimensional control can be realized by combining three landing signal generating devices, or one or two landing signal generating devices and external information such as GPS. Here, not only when the moving body such as the drone 2 lands but also when the moving body transfers an object to a person or the like, if it can be put in one-dimensional control (control of only a linear distance with a person), it is possible to safely control the distance to people with only gestures or two buttons of "approaching" and "departing".

Further, the information processing apparatus to which the present invention is applied is not limited to the above-described sixth embodiment, and various other embodiments including the following configurations may be taken. That is, the information processing apparatus to which the present invention is applied includes
 a landing control means that calculates the relative position of the moving body from the landing signal generating device based on the time and the position information transmitted from the landing signal generating device mounted on advance in the vicinity of the landing point of the moving body (for example, the drone 2) and executes control for executing the landing operation based on a result of the calculation.

As a result, it is possible to accurately estimate the position of the moving body such as the drones 2 as the relative coordinates with the landing point by mounting a plurality of signal generating devices equipped with the time information on the ground.

EIGHTH EMBODIMENT

Dither Control and Dither Clip

For coping with the drone 2, a robot and the like, wired connections are frequently used due to safety, necessity of feeding power, and the like. Even in logistics and the like, in many cases, long and tough string (dither) are used when hanging objects to be conveyed. Further, it is very difficult to tie strings with the drone 2, the robot, and the like, and there is no precedent for a device that ties strings. As a method of controlling the drone 2, there is a method of moving as programmed in advance, or piloting with a propo or a smartphone, but there are not many methods of intuitively moving. Further, control of the drone 2 is generally piloting the drone 2 using a piloting device programmed in advance. There is not much suggestion on how the drone pilot 3 intuitively moves the drone 2. The dither control according to the eighth embodiment intends to provide a new dither control effective for a drone 2, a robot, and the like. The dither clip according to the eighth embodiment aims to provide a novel openable and closable dither clip to be attached to a string tip. Currently, it is performed to connect with a string that can cover a flight range so that the drone 2 may not fly uncontrollably. Further, there is also a method of supplying electricity to the drone 2 by wires. The present inventors have examined a technique of using such a wired connection for controlling the flight of the drone 2. Therefore, the dither interface according to the eighth embodiment intends to provide a novel system of piloting the drone 2 using a string.

(Dither Control)

In order to secure free movement of the drone 2, the robot and the like, it has a margin in length and uses it slackly in the case of the wire. The eighth embodiment intends to provide a control (dither control) using a dither and a clip (a dither clip). In the dither control, two points in the middle of a wired member connecting the drone 2, the robot, and the like to the control device are connected by elastic members (for example, rubber) to give an appropriate tension. Due to the tension of the elastic member, the wire is pulled with a desired tension and is not loosen. Further, when the wire is pulled, the elastic member elongates to absorb the tensile stress. In coping with the robot, including the drone 2, wired connections are frequently used due to safety and power supply. In many times, strings are used when hanging things also in logistics and the like. In many cases, strings are utilized slackly for the wire. Stable control can be provided by sandwiching an elastic rubber or the like therebetween and applying an appropriate tension thereto. The method of using strings so that power feeding and the flying of the drone 2 may not be uncontrollable is famous. It is possible to recognize that the drone 2 is pulled with the string and performs a control accordingly by developing a technique to connect strings without slackening. For example, sandwiching the rubber (or spring or the like) between the drone 2 (robot) and a cable makes control easier. (It is preferable that an attachment position is near a center of gravity.) It is also convenient for hanging baggage. Since inclination and tension of the dither can be known, it can be used for control alone. Operations such as pulling by a person can be utilized as an interface as described later.

(Dither Clip)

It is very difficult to tie strings with the robot including the drone 2, although an object to be clamped may be sometimes wrapped around, but there is no precedent as a device. However, such a work is indispensable for the robot to replace human work, and it is considered important to make simple equipment for frequent use. Therefore, a device is provided that can be hooked on a leg, a tree and the like of a desk by mounting an openable/closable device at the string tip.

Figure 13:
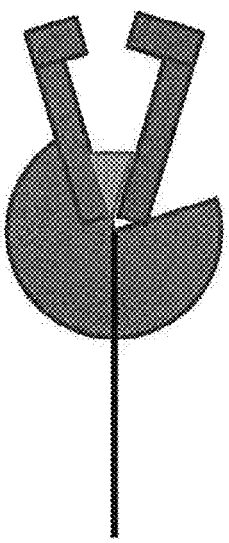
FIG. 13 is a sectional view of a dither grip.

FIG. 13 is a cross-sectional view of the dither clip. One clip piece and the other clip piece have a structure in which a tip portion is closed by a spring (not illustrated). Initially, both the clip pieces are forced to be opened by a wedge-shaped opening member. After clamping the object to be held between both the clip pieces, both the clip pieces are closed by a force of the spring to fix the object by removing the wedge-shaped opening member. The dither clip is attached to the string tip. By using this dither clip, one end of a string can be easily engaged to a crosspiece of a building, a branch of a tree or the like. Further, when connected to an object, it is possible to automatically separate this structure from the robot. This aims to change the electric wire. An operator having a string detects a pulling and a determines by using a table that specifies an intention of the operator having the string from its orientation, urgency, and the like, and appropriate control can be performed. This table can be automatically updated by machine learning and the like. In addition, it is also possible to attach a winch rope of an unmanned vehicle or the like to a high place or to hoist it by air-ground cooperation and the like. Thus, it is important in terms of interaction, and it is possible to realize an action such as pet by detecting pulling of the string and using it for control.

Further, the information processing apparatus to which the present invention is applied is not limited to the above-described eighth embodiment, and various other embodiments including the following configurations may be taken. That is, the information processing apparatus to which the present invention is applied includes a dither control means that controls the moving body by connecting an elastic member to a moving body (for example, the drone 2).

As a result, it is possible to stably control the moving body such as the drone 2 by sandwiching the wire with the elastic rubber or the like and applying an appropriate tension. Further, it is possible to stably feed power to the moving body such as the drones 2 by using the wired connection. Then, a wire may also be used to attach a simple robot arm (for example, FIG. 13) to the moving body such as the drone 2. The simple robot arm described above is fixed with a wedge and the user removes the wedge, so that a luggage is pinched and fixed by a force of the spring and can be transported as it is by a moving body such as the drone 2, and since the aforementioned simple robot arm can be separated automatically, loading and unloading can be done easily.

NINTH EMBODIMENT

Contact Prevention and Individual Authentication

Conventionally, there are primary radar (primary radar), secondary radar (secondary radar), FR 24 which is a receiving system of ADS-B and ADS-B, and the like for tracking a route of a commercial aircraft. The primary radar is a system which a ground radar tracks. The secondary radar is a system where a transponder of an aircraft returns a 4-digit individual recognition signal in response to an inquiry from the ground radar, enabling identification of the aircraft. The ADS-B is a system in which an aircraft notifies location information by GPS to the ground and other surrounding aircraft. The FR 24 is a system that receives a radio wave of the ADS-B at a receiving device on which a flight radar 24 is mounted and transfers it to a server. As for the drone, it is also important to construct a tracking system for flight route. Therefore, the present embodiment intends to provide a route tracking system of the drone.

The route tracking system of the drone 2 is a system built by mounting an appropriate wireless device in the drone 2 and constantly outputting an individual recognition signal at the time of flight. This wireless device may be, for example, a device using Bluetooth (registered trademark) or the like. An individual recognition signal transmitted from the wireless device mounted on the drone 2 is received by the information processing terminal 4B on the ground, the Wi-Fi spot and the like 5, and other drones that fly around the drone 2. This individual recognition signal includes at least an individual identification number (ID), position coordinates of the drones 2 during flight, and other additional information. Here, the individual identification number (ID) is a dedicated ID given to each drone, the position coordinate is, for example, position information obtained by GPS, and the additional information is arbitrary information useful for individual recognition of the drone.

Further, in association with the individual identification number (ID), information such as a name, a title, contact information and the like of a drone pilot 3, a type of the drone, usage, a flight plan associated with time and the like are recorded in a server 6 on the ground in advance, whereby various usage methods become possible.

According to the present embodiment, it is possible to provide a route tracking system for the drone 2. The route tracking system of the drone 2 has the following secondary effects.

(1) When receiving an individual recognition signal of another drone, the drone pilot 3 can recognize that another drone exists in the surrounding area.

(2) The drone pilot 3 can grasp a distance to another drone, scheduled movement information of another drone, and the like based on a position coordinate or a radio wave intensity of individual recognition signal of another drone.

(3) When receiving the individual recognition signal of another drone, the drone pilot 3 can confirm validity, scheduled flight route and the like of another drone by additional information of the signal or information recorded in the server computer 6 from the individual identification number (ID). If necessary, a pilot of another drone may be contacted online.

(4) The drone pilot 3 can instruct an appropriate avoidance action for his own drone 2 as necessary based on scheduled flight route and the like of another drone.

(5) It becomes possible to invalidate a drone 2 that is stolen and to recover the drone 2 when it flies by constructing a system that always transmits an individual recognition signal during flight.

The route tracking system during the flight of the drone 2 can also be applied to a robot equipped with artificial intelligence. Collision between robots in operation is dangerous. It is possible to construct a movement tracking system of the robot by constantly transmitting the same individual identification signal from the robot in operation. The above-mentioned side effects (1) to (5) may also be brought about.

Further, the individual identification number may be confirmed online by including it in a signal transmitted all the time as described above, and it may also be confirmed offline with a dedicated decoder.

In summary, contact between robots including the drone 2 is very dangerous. It is also very important to manage whether or not it is flying for a safe purpose. Therefore, it is possible to realize a method of management and avoidance of contact by issuing the individual recognition signal from the robot at all times. A wireless device using Bluetooth (registered trademark) or the like is mounted on various unmanned aircrafts including the drone 2 and transmits a signal including an individual identification number. Specifically, for example, this signal can take a form of an individual identification number+a coordinate (such as GPS)+additional information. When receiving this signal, a receiving side of the information processing terminal 4B or the like knows that there is another nearby unmanned aircraft. In a case where there is coordinate information in this signal or in a case where a distance is known by a radio field intensity, the receiving side can know movement information from the change. Further, the receiving side can confirm a route or validity of this unmanned aircraft by making inquiries online by relying on additional information and the like.

Further, the information processing apparatus to which the present invention is applied is not limited to the above-described ninth embodiment, and various other embodiments including the following configurations may be taken. That is, the information processing apparatus to which the present invention is applied includes a wireless communication control means mounted on a moving body (for example, the drone 2) that executes control to wirelessly transmit a signal including an individual identification number and position information.

As a result, it is possible to provide a route tracking system for the moving body. The route tracking system of this moving body can exhibit the secondary effects (1) to (5) as described above.

Although the first to ninth embodiments of the present invention have been described above, the present invention is not limited to the above-described embodiments, and variations, improvements and the like within the scope of achieving objects of the present invention are included in the present invention.

Further, for example, the series of processes described above may be executed by hardware or software. In other words, the block diagrams of FIG. 2, FIG. 4 and the like are merely examples of configurations and are not particularly limited. That is, it suffices if the information processing system has a function capable of executing the above-described series of processes as a whole, and blocks to be used to realize this function are not particularly limited to the examples of FIG. 2, FIG. 4, and the like. In addition, one functional block may be constituted by only hardware, only software, or a combination thereof.

Further, for example, in a case where a series of processes are executed by software, a program constituting the software is installed in a computer or the like from a network or a recording medium. The computer may be a computer incorporated in dedicated hardware. Further, the computer may be a computer capable of executing various functions by installing various programs, for example a server, a smartphone, a personal computer, various devices, or the like.

Further, for example, a recording medium including such a program is not only constituted by a removable medium (not illustrated) distributed separately from a main body of the apparatus in order to provide a program to the user, but also constituted by a recording medium and the like provided to the user in a state of being incorporated in the main body of the apparatus in advance.

In the present specification, steps describing programs to be recorded on the recording medium include not only processes performed in chronological order according to the order but also processes executed in parallel or individually, though not necessarily being processed in chronological order. Further, in this specification, the term of the system means an entire apparatus constituted by a plurality of apparatuses, a plurality of means, and the like.

EXPLANATION OF REFERENCE NUMERALS

1: satellite,
2: drone,
3: drone pilot,
4: information processing terminal,
6: server computer,
7: communication line,
10: converter module,
11: communication means,
12: control means,
13: communication means for drone,
15: onboard communication means of drown,
16: drone board,
20: FDR module,
22: communication means,
24: control means,
26: sensor means,
28: sensor means,
P: landing port,
B: projection,
F: planar section,
L: leg section,
T1: charging terminal,
T2: charging terminal,
PB: projection,
PD: recess,
LB: projection,
LD: recess,
S: elastic body

The invention claimed is:

1. A communication control apparatus controlling a communication between a first information processing apparatus that performs a communication based on a first communication mode and a second information processing apparatus that performs a communication based on a second communication mode different from the first communication mode, the second information processing apparatus having a communication means implemented with a control circuit, and
   the communication control apparatus is mounted on the second information processing apparatus having a possibility of moving outside a reachable range of a predetermined radio wave, the communication control apparatus comprising:
   a first communication mode conversion means, when the second information processing apparatus is outside a reachable range of a predetermined radio wave, a first signal from the first information processing apparatus based on the first communication mode is received via a communication network and when the second information processing apparatus is within the reachable range of a predetermined radio wave, the first signal is received using a direct communication and the first communication mode conversion means converts a communication mode of the first signal into the second communication mode;
   a first transmission control means that executes control to transmit the first signal to the communication means of the second information processing apparatus based on the second communication mode;
   a second communication mode conversion means that receives a second signal from the communication means of the second information processing apparatus based on the second communication mode and converts a communication mode of the second signal into the first communication mode; and
   a second transmission control means, when the second information processing apparatus is outside the reachable range of a predetermined radio wave, that executes control to transmit the second signal to the first information processing apparatus via a communication network, based on the first communication mode and when the second information processing apparatus is within the reachable range of a predetermined radio wave, that executes control to transmit the second signal to the first information processing apparatus using a direct communication, based on the first communication mode.

2. An information processing method performed by a communication control apparatus controlling a communication between a first information processing apparatus that performs a communication based on a first communication mode and a second information processing apparatus that performs a communication based on a second communication mode different from the first communication mode, the second information processing apparatus having a communication means implemented with a control circuit, and
   the communication control apparatus is mounted on the second information processing apparatus having a possibility of moving outside a reachable range of a predetermined radio wave, the method comprising:
   a first communication mode conversion step, when the second information processing apparatus is outside the reachable range of a predetermined radio wave, a first signal from the first information processing apparatus based on the first communication mode is received via a communication network and when the second information processing apparatus is within the reachable range of a predetermined radio wave, the first signal is received using a direct communication and the first communication mode conversion step of converting a communication mode of the first signal into the second communication mode;
   a first transmission control step of executing control to transmit the first signal to the communication means of the second information processing apparatus based on the second communication mode;
   a second communication mode conversion step of receiving a second signal from the communication means of the second information processing apparatus based on the second communication mode and converting a communication mode of the second signal into the first communication mode; and
   a second transmission control step, when the second information processing apparatus is outside the reachable range of a predetermined radio wave, that of executing control to transmit the second signal to the first information processing apparatus via a communication network, based on the first communication mode and when the second information processing apparatus is within the reachable range of a predetermined radio wave, that of executing control to transmit the second signal to the first information processing apparatus using a direct communication, based on the first communication mode.

3. A non-transitory computer readable medium storing an information processing program causing a computer to perform a control processing, the program controlling a communication between a first information processing apparatus that performs a communication based on a first communication mode and a second information processing apparatus that performs a communication based on a second communication mode different from the first communication mode, the second information processing apparatus having a communication means implemented with a control circuit, and the program is stored in the second information processing apparatus having a possibility of moving outside a reachable range of a predetermined radio wave, the control processing comprising:

a first communication mode conversion step, when the second information processing apparatus is outside the reachable range of a predetermined radio wave, a first signal from the first information processing apparatus based on the first communication mode is received via a communication network and when the second information processing apparatus is within the reachable range of a predetermined radio wave, the first signal is received using a direct communication and the first communication mode conversion step of converting a communication mode of the first signal into the second communication mode;

a first transmission control step of executing control to transmit the first signal to the communication means of the second information processing apparatus based on the second communication mode;

a second communication mode conversion step of receiving a second signal from the communication means of the second information processing apparatus based on the second communication mode and converting a communication mode of the second signal into the first communication mode; and a second transmission control step, when the second information processing apparatus is outside the reachable range of a predetermined radio wave, that of executing control to transmit the second signal to the first information processing apparatus via a communication network, based on the first communication mode and when the second information processing apparatus is within the reachable range of a predetermined radio wave, that of executing control to transmit the second signal to the first information processing apparatus using a direct communication, based on the first communication mode.

* * * * *